US012668067B2

(12) United States Patent (10) Patent No.: US 12,668,067 B2
Oura et al. (45) Date of Patent: Jun. 30, 2026

(54) PRINTING APPARATUS AND PRINT CONTROL METHOD

(71) Applicant: SCREEN Holdings Co., Ltd., Kyoto (JP)

(72) Inventors: Mutsuki Oura, Kyoto (JP); Susumu Takahashi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 152 days.

(21) Appl. No.: 18/813,314

(22) Filed: Aug. 23, 2024

(65) Prior Publication Data

US 2025/0074071 A1 Mar. 6, 2025

(30) Foreign Application Priority Data

Aug. 29, 2023 (JP) ................................. 2023-138919

(51) Int. Cl.
| | |
|---|---|
| *B41J 2/21* | (2006.01) |
| *B41J 11/00* | (2006.01) |
| *B41J 15/04* | (2006.01) |
| *G06K 15/00* | (2006.01) |
| *G06K 15/02* | (2006.01) |

(52) U.S. Cl.
CPC ........... *B41J 2/2142* (2013.01); *B41J 2/2121* (2013.01); *B41J 2/2135* (2013.01); *B41J 2/2139* (2013.01); *B41J 11/0095* (2013.01); *B41J 15/048* (2013.01); *G06K 15/027* (2013.01);
(Continued)

(58) Field of Classification Search
CPC ...... B41J 2/2142; B41J 2/2121; B41J 2/2135; B41J 2/2139; B41J 11/0095; B41J 15/048; B41J 2/2146; B41J 11/008; G06K 15/027; G06K 15/1848; G06K 15/408; G06K 2215/101
See application file for complete search history.

(56) References Cited

U.S. PATENT DOCUMENTS

| | | | |
|---|---|---|---|
| 2016/0075155 A1 | 3/2016 | Fukui et al. | |
| 2016/0114576 A1* | 4/2016 | Tobita ................... | B41J 2/2146 347/14 |

FOREIGN PATENT DOCUMENTS

| | | | |
|---|---|---|---|
| JP | 2016-055570 A | 4/2016 | |
| WO | WO-2019131104 A1 * | 7/2019 | ......... B65H 23/1888 |

OTHER PUBLICATIONS

Yoshida Mitsuhiro et a., "Substrate Processing Device and Substrate Processing Method" (WO 2019131104 A1), Jul. 4, 2019, [Abstract] (Year: 2019).*

* cited by examiner

*Primary Examiner* — Lisa Solomon
(74) *Attorney, Agent, or Firm* — Rimon P.C.

(57) ABSTRACT

In an inkjet printing apparatus having a meandering correction function, a layout processing unit, configured to generate printing image data by determining the print positions of the respective images on each of a plurality of pages to be printed, shifts, for a normal page, the print positions of all the images in a paper width direction on the basis of the meandering amount of the printing paper with reference to the print positions when printing paper does not meander, and shifts, for a nozzle check page, the print position of a cue mark in the paper width direction on the basis of the meandering amount of the printing paper with reference to the print position when the printing paper does not meander while maintaining the print position of an ejection failure detecting pattern image at the print position when the printing paper does not meander.

10 Claims, 24 Drawing Sheets

(52) U.S. Cl.
CPC ....... *G06K 15/1848* (2013.01); *G06K 15/408* (2013.01); *G06K 2215/101* (2013.01)

Fig.4

CONVEYANCE DIRECTION OF PRINTING PAPER

Fig.5

CONVEYANCE DIRECTION OF PRINTING PAPER

PAPER WIDTH DIRECTION

PAPER WIDTH DIRECTION

PRINTING APPARATUS AND PRINT CONTROL METHOD

BACKGROUND OF THE INVENTION

Field of the Invention

The present invention relates to a printing apparatus that performs printing by ejecting ink onto an elongated print medium (i.e., relates to an inkjet continuous printing apparatus), and more particularly, to a technique for accurately identifying a position of a nozzle in an ejection failure state (hereinafter referred to as an "ejection failure nozzle") even when the print medium meanders.

Description of Related Art

There has been known an inkjet printing apparatus that performs printing by ejecting ink onto a print medium such as printing paper. In the inkjet printing apparatus, a longer ejection interval may cause ink drying due to solvent evaporation near a nozzle, air bubbles mixing into the nozzle, dust adhesion to the nozzle, or the like during a period when printing is performed. That is, nozzle ejection failure may occur. When ejection failure occurs, defects in a print image, such as white streaks or missing dots, may occur. Therefore, conventionally, operations for recovering the function of the ejection failure nozzle (cleaning or flushing) have been performed. Furthermore, alternative dropping in which ink droplets to be ejected by the ejection failure nozzle are ejected by a peripheral nozzle, has been performed. Note that the ejection failure nozzle is detected, for example, through visual observation by an operator, numerical analysis by an inspection apparatus, or other means, on the basis of a print image of a predetermined pattern image as a test chart (hereinafter referred to as an "ejection failure detecting pattern image").

In the inkjet printing apparatus, when a print medium is being conveyed by a conveyance mechanism, the print medium may meander. When the print medium meanders, misregistration (e.g., misalignment between the front and the back surfaces or misalignment among a plurality of colors) occurs, leading to deteriorated print quality. Therefore, a technique has been proposed to correct input image data so that the print position of an image is shifted depending on the meandering amount of the print medium. Such a technique is disclosed in, for example, Japanese Laid-Open Patent Publication No. 2016-55570. In the following description, a function that corrects the input image data depending on the meandering amount of the print medium to inhibit the occurrence of misregistration is referred to as a "meandering correction function".

Meanwhile, in an inkjet printing apparatus having the meandering correction function, a process of shifting the print position of an image depending on the meandering amount of the print medium (hereinafter referred to as a "print position shift process") is performed for all pages during printing. For this reason, in a case in which a plurality of pages to be printed include a normal page including an image based on submitted data and a nozzle check page including the ejection failure detecting pattern image described above, the print position shift process is performed on not only the normal page but also the nozzle check page. Therefore, even when an ejection failure nozzle is detected on the basis of the print image of the ejection failure detecting pattern image included in the nozzle check page, the accurate position of the ejection failure nozzle cannot be identified. Thus, for example, the presence or absence of an ejection failure nozzle is determined for each head (ink ejection head). However, it is strongly desired to accurately identify the position of the ejection failure nozzle while inhibiting the occurrence of misregistration caused by the meandering of the print medium.

SUMMARY OF THE INVENTION

Therefore, an object of the present invention is to enable accurate identification of the position of an ejection failure nozzle in an inkjet printing apparatus having a meandering correction function.

One aspect of the present invention is directed to a printing apparatus that performs printing by ejecting ink onto a print medium having a shape elongated in a conveyance direction, the printing apparatus including:

a conveyance mechanism configured to convey the print medium in a first direction;

at least one ink ejection head including a plurality of nozzles arranged in a second direction orthogonal to the first direction, and configured to eject ink from the plurality of nozzles onto the print medium being conveyed by the conveyance mechanism;

at least one end detection sensor configured to detect a position of an end of the print medium being conveyed by the conveyance mechanism;

a meandering amount calculation unit configured to obtain a meandering amount of the print medium on a basis of the position of the end detected by the at least one end detection sensor;

a mark image detection sensor configured to detect a mark image to be placed at a predetermined position on the print medium;

a layout processing unit configured to generate printing image data by determining, on a basis of input image data including a plurality of images, print positions of respective images on each of a plurality of pages to be printed, in consideration of the meandering amount; and an ink ejection control unit configured to control ejection of ink from the at least one ink ejection head on a basis of the printing image data, wherein the plurality of pages includes a nozzle check page including the mark image and an ejection failure detecting pattern image for detecting a nozzle in an ejection failure state from among the plurality of nozzles, and a normal page including the mark image and an image other than the ejection failure detecting pattern image, and for the normal page, the layout processing unit shifts print positions of all the images in the second direction on a basis of the meandering amount with reference to the print positions when the meandering amount is zero, and for the nozzle check page, the layout processing unit shifts a print position of the mark image in the second direction on a basis of the meandering amount with reference to the print position when the meandering amount is zero while maintaining a print position of the ejection failure detecting pattern image at the print position when the meandering a mount is zero.

According to such a configuration, the printing apparatus is provided with the layout processing unit that generates the printing image data by determining the print positions of the respective images in each of the plurality of pages to be printed, in consideration of the meandering amount of the print medium. For the normal page, the layout processing unit shifts the print positions of all the images in the second direction (a direction orthogonal to the conveyance direction of the print medium) on the basis of the meandering amount of the print medium. However, for the nozzle check page used to detect a nozzle in an ejection failure state (an ejection failure nozzle), the layout processing unit shifts the print position of the mark image in the second direction on the basis of the meandering amount of the print medium without shifting the print position of the ejection failure detecting pattern image. As a result, even when the print medium meanders, the positional relationship between the ejection failure detecting pattern image and the nozzle is maintained, and the positional relationship between the print medium and the mark image is also maintained. Therefore, the position of the ejection failure nozzle can be accurately identified through inspection based on the print image of the ejection failure detecting pattern image. In addition, misalignment between the front and back surfaces or an error when the mark image is detected by the mark image detection sensor does not occur. As above, in the printing apparatus having the meandering correction function, the position of the ejection failure nozzle can be identified accurately.

Another aspect of the present invention is directed to a printing apparatus that performs printing by ejecting ink onto a print medium having a shape elongated in a conveyance direction, the printing apparatus including:

a conveyance mechanism configured to convey the print medium in a first direction;

at least one ink ejection head including a plurality of nozzles arranged in a second direction orthogonal to the first direction, and configured to eject ink from the plurality of nozzles onto the print medium being conveyed by the conveyance mechanism;

at least one end detection sensor configured to detect a position of an end of the print medium being conveyed by the conveyance mechanism;

a mark image detection sensor configured to detect a mark image to be placed at a predetermined position on the print medium;

a processor; and a memory configured to store a program, wherein when the program stored in the memory is executed by the processor, the program causes the processor to execute:

(A) obtaining a meandering amount of the print medium on a basis of the position of the end detected by the at least one end detection sensor, (B) generating printing image data by determining, on a basis of input image data including a plurality of images, print positions of respective images on each of a plurality of pages to be printed, in consideration of the meandering amount, and (C) controlling ejection of ink from the at least one ink ejection head on a basis of the printing image data, the plurality of pages includes a nozzle check page including the mark image and an ejection failure detecting pattern image for detecting a nozzle in an ejection failure state from among the plurality of nozzles, and a normal page including the mark image and an image other than the ejection failure detecting pattern image, and in generating the printing image data, for the normal page, the processor shifts print positions of all the images in the second direction on a basis of the meandering amount with reference to the print positions when the meandering amount is zero, and for the nozzle check page, the processor shifts a print position of the mark image in the second direction on a basis of the meandering amount with reference to the print position when the meandering amount is zero while maintaining a print position of the ejection failure detecting pattern image at the print position when the meandering amount is zero.

Still another aspect of the present invention is directed to a print control method used in a printing apparatus that performs printing by ejecting ink onto a print medium having a shape elongated in a conveyance direction, the printing apparatus including a conveyance mechanism configured to convey the print medium in a first direction, at least one ink ejection head including a plurality of nozzles arranged in a second direction orthogonal to the first direction, and configured to eject ink from the plurality of nozzles onto the print medium being conveyed by the conveyance mechanism, at least one end detection sensor configured to detect a position of an end of the print medium being conveyed by the conveyance mechanism, and a mark image detection sensor configured to detect a mark image to be placed at a predetermined position on the print medium, the print control method including:

obtaining a meandering amount of the print medium on a basis of the position of the end detected by the at least one end detection sensor;

generating printing image data by determining, on a basis of input image data including a plurality of images, print positions of respective images on each of a plurality of pages to be printed, in consideration of the meandering amount; and controlling ejection of ink from the at least one ink ejection head on a basis of the printing image data, wherein the plurality of pages includes a nozzle check page including the mark image and an ejection failure detecting pattern image for detecting a nozzle in an ejection failure state from among the plurality of nozzles, and a normal page including the mark image and an image other than the ejection failure detecting pattern image, and in generating the printing image data, for the normal page, print positions of all the images are shifted in the second direction on a basis of the meandering amount with reference to the print positions when the meandering amount is zero, and for the nozzle check page, a print position of the ejection failure detecting pattern image is maintained at the print position when the meandering amount is zero and a print position of the mark image is shifted in the second direction on a basis of the meandering amount with reference to the print position when the meandering amount is zero.

These and other objects, features, modes, and advantageous effects of the present invention will become more apparent from the following detailed description of the present invention with reference to the accompanying drawings.

BRIEF DESCRIPTION OF THE DRAWINGS

FIG. 4 is a schematic plan view of the main part of the printing mechanism according to the embodiment as viewed from above;

FIG. 5 is a plan view showing a configuration example of a recording unit according to the embodiment;

FIG. 7 is a block diagram showing a hardware configuration of print controller according to the embodiment;

DETAILED DESCRIPTION OF PREFERRED EMBODIMENT

An embodiment of the present invention will be described below with reference to the accompanying drawings. It is assumed that a plurality of pages to be printed include a nozzle check page and a normal page.

<1. Overall Configuration of Printing System>

Figure 1:
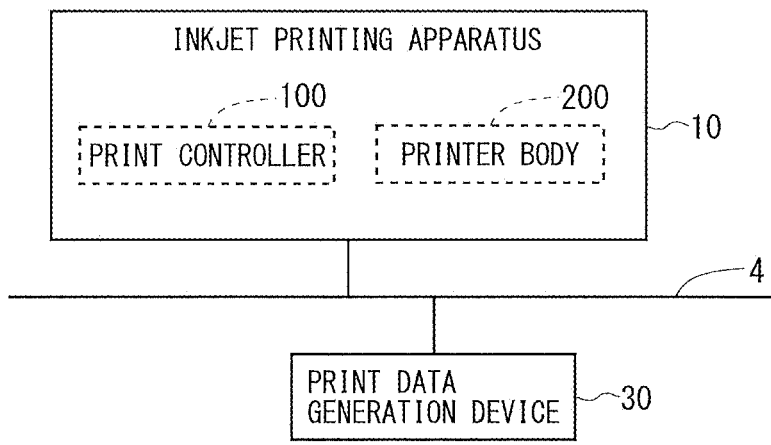
FIG. 1 is an overall configuration diagram of a printing system according to an embodiment of the present invention.

FIG. 1 is an overall configuration diagram of a printing system according to an embodiment of the present invention. The printing system includes an inkjet printing apparatus 10 and a print data generation device 30. The inkjet printing apparatus 10 and the print data generation device 30 are connected to each other through a local-area network (LAN) 4. The print data generation device 30 generates image data for printing by performing a rasterization process on submitted data such as a portable document format (PDF) file. This image data is data not subjected to a halftone process, and the halftone process is performed by a print controller 100 in the inkjet printing apparatus 10 as described later. The image data generated by the print data generation device 30 is transmitted to the inkjet printing apparatus 10 via the LAN 4. Note that the print data generation device 30 also transmits print information defining the arrangement positions of images on each page to the inkjet printing apparatus 10. The inkjet printing apparatus 10 includes a printer body 200, and a print controller 100 that controls the operation of the printer body 200. The inkjet printing apparatus 10 outputs a print image on printing paper as a printing medium on the basis of image data transmitted from the print data generation device 30 without using a printing plate. Note that the present invention can also be applied to a case where a print medium other than the printing paper is used (e.g., a film is used).

<2. Configuration of Printer Body of Inkjet Printing Apparatus>

Figure 2:
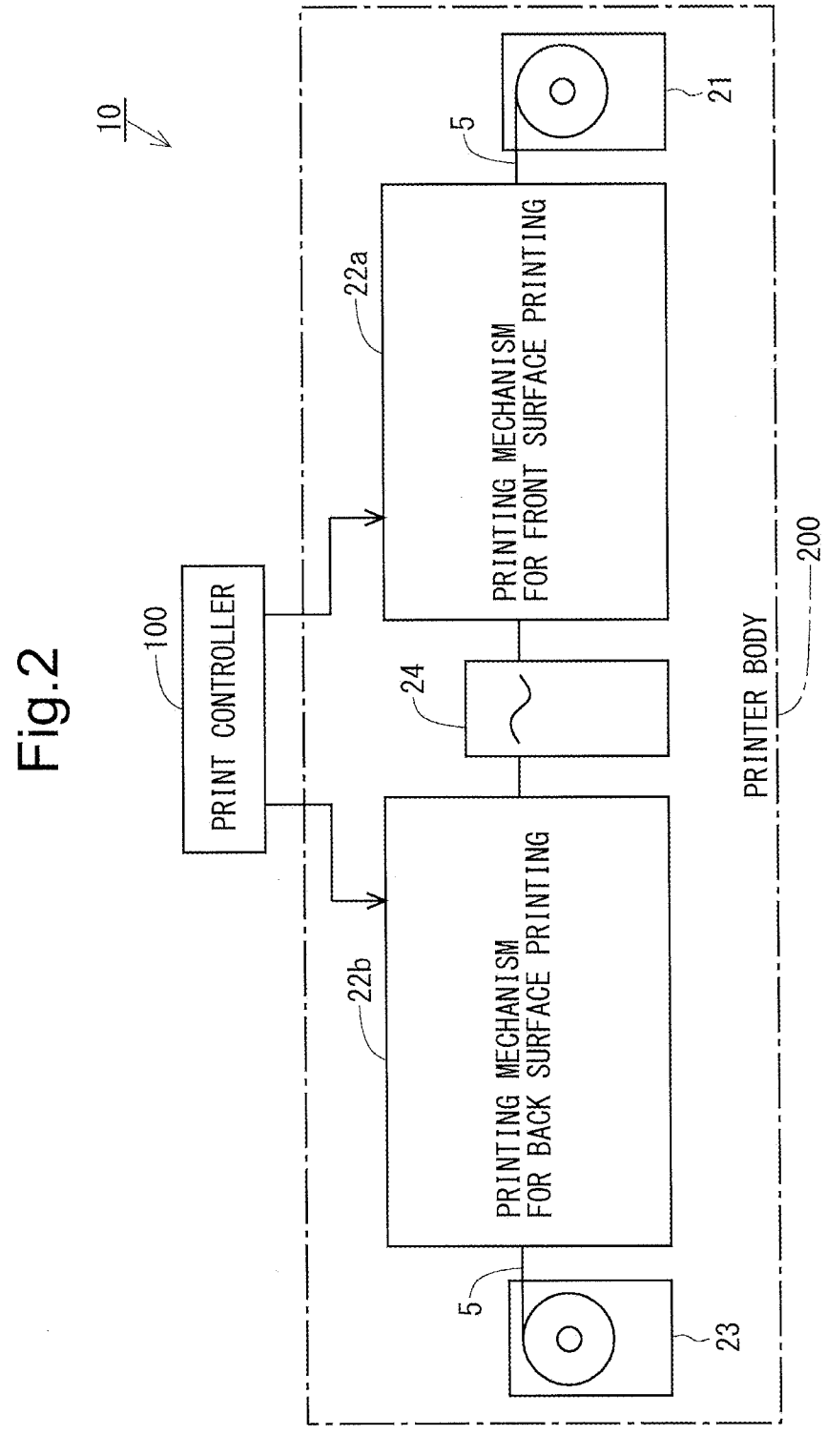
FIG. 2 is a diagram showing a schematic configuration of an inkjet printing apparatus according to the embodiment.

FIG. 2 is a diagram showing a schematic configuration of the inkjet printing apparatus 10. As described above, the inkjet printing apparatus 10 includes the printer body 200 and the print controller 100. The printer body 200 includes a paper feeding unit 21 that supplies printing paper (in this example, a roll of printing paper) 5 having an elongated shape in the conveyance direction, a printing mechanism 22a for front surface printing, a reversing unit 24 that reverses the front and back surfaces of the printing paper 5, a printing mechanism 22b for back surface printing, and a paper winding unit 23 that rolls up the printing paper 5 after printing. The printing mechanism 22a for front surface printing and the printing mechanism 22b for back surface printing have the same configuration. Hereinafter, when the printing mechanism 22a for front surface printing and the printing mechanism 22b for back surface printing are not distinguished, the printing mechanism is denoted by reference numeral 22.

Figure 3:
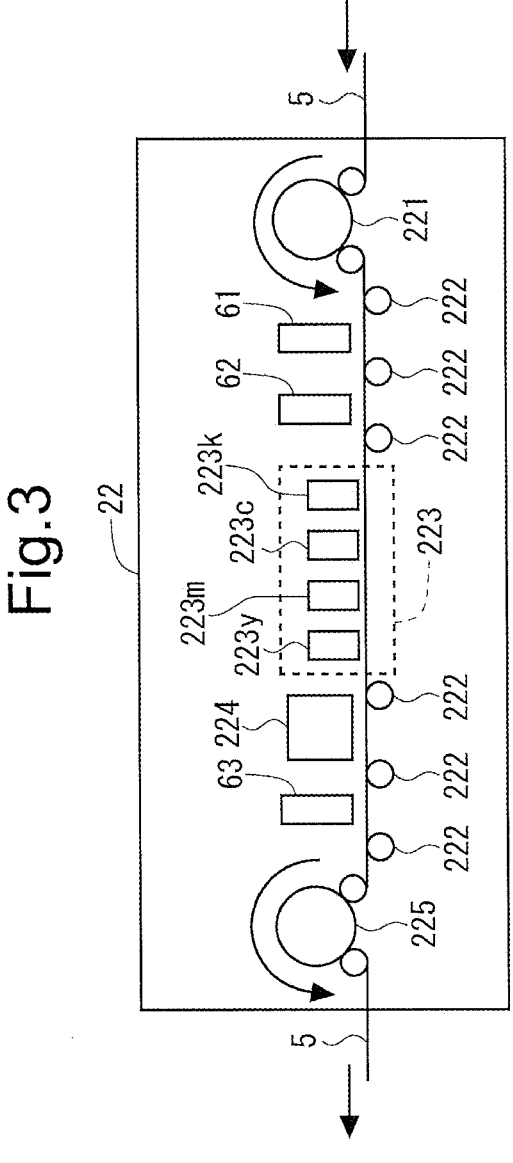
FIG. 3 is a schematic diagram showing a configuration example of a printing mechanism according to the embodiment.

FIG. 3 is a schematic diagram showing a configuration example of the printing mechanism 22. The printing mechanism 22 includes a first drive roller 221 for conveying the printing paper 5 to the inside, a plurality of support rollers 222 for conveying the printing paper 5 inside the printing mechanism 22, a recording unit 223 for recording a print image on the printing paper 5, a drying mechanism 224 for drying the printing paper 5 on which the print image is recorded, and a second drive roller 225 for outputting the printing paper 5 from the inside of the printing mechanism 22. Note that a conveyance mechanism that conveys the printing paper 5 in a predetermined conveyance direction is implemented by the paper feeding unit 21 (cf. FIG. 2), the first drive roller 221, the plurality of support rollers 222, the second drive roller 225, and the paper winding unit 23 (cf. FIG. 2). The recording unit 223 includes a K-color head unit 223k that ejects K color (black) ink, a C-color head unit 223c that ejects C color (cyan) ink, an M-color head unit 223m that ejects M color (magenta) ink, and a Y-color head unit 223*y* that ejects Y color (yellow) ink. In the following description, when the K-color head unit 223*k*, the C-color head unit 223*c*, the M-color head unit 223*m*, and the Y-color head unit 223*y* are not distinguished from each other, the head unit is denoted by reference numeral 223. The printing mechanism 22 also includes an end detection sensor 61 that detects a position of one end (hereinafter referred to as an "edge position"), for a paper width direction (a direction orthogonal to the conveyance direction of the printing paper 5), of the printing paper 5 conveyed by the conveyance mechanism, a cue mark detection sensor 62 that detects a cue mark representing a start position of an image print area corresponding to each page, and an in-line scanner 63 as an imaging device that captures a print image. Imaging data obtained by the in-line scanner 63 capturing the print image is transmitted to the print controller 100.

Note that the configuration shown in FIG. 3 is an example, and the present invention is not limited thereto. For example, the cue mark detection sensor 62 may not be provided in the printing mechanism 22*a* for front surface printing, and the cue mark detection sensor 62 may be provided only in the printing mechanism 22*b* for back surface printing.

Figure 4:
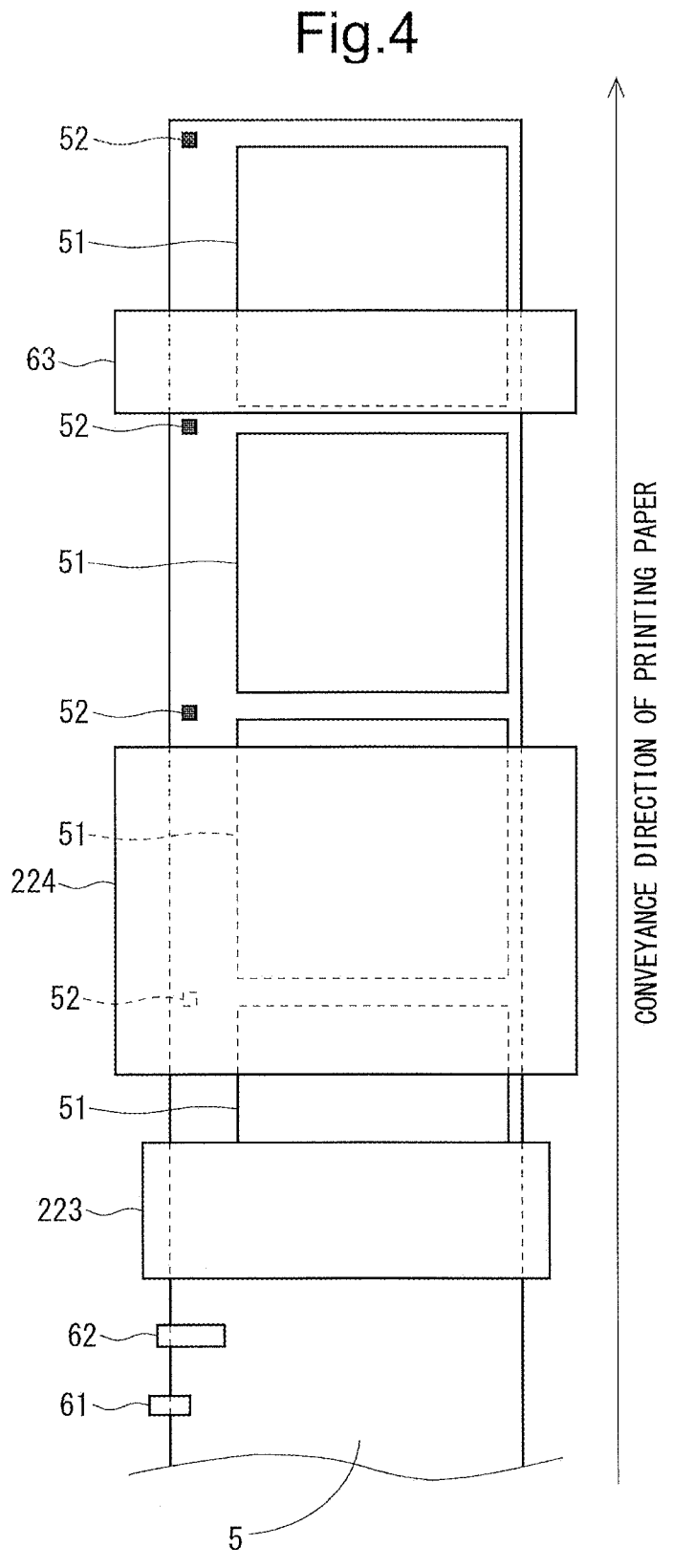

FIG. 4 is a schematic plan view of the main part of the printing mechanism 22 as viewed from above. The printing paper 5 is continuously conveyed from the lower side to the upper side in FIG. 4. In the process of conveying the printing paper 5, the end detection sensor 61 detects the edge position described above. Next, the cue mark detection sensor 62 detects the cue mark 52, for example, in a case in which printing is performed on the printing paper 5 where only the cue mark 52 has already been printed, or in a case in which printing is resumed after the printing paper 5 is rewound due to the occurrence of a print interruption after the printing of the cue mark 52. Thereafter, the recording unit 223 records an image in an image print area 51. Note that, for example, in a case in which the cue mark 52 has not yet been recorded on the printing paper 5, the cue mark 52 is also recorded on the printing paper 5. The printing paper 5 on which the print image is recorded passes through the drying mechanism 224. As a result, the printing paper 5 is dried. Thereafter, the in-line scanner 63 captures the print image.

Figure 5:
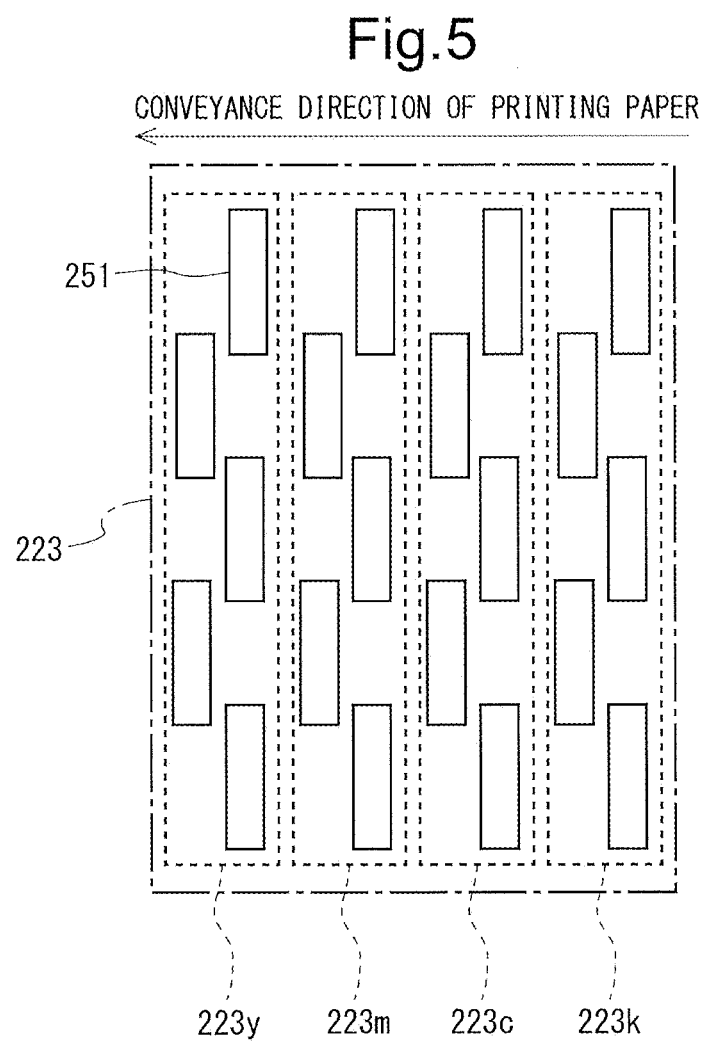

FIG. 5 is a plan view showing a configuration example of the recording unit 223. As shown in FIG. 5, the recording unit 223 includes the K-color head unit 223*k*, the C-color head unit 223*c*, the M-color head unit 223*m*, and the Y-color head unit 223*y* arranged in a row in the conveyance direction of the printing paper 5. Each head unit 223 includes a plurality of ink ejection heads (print heads) 251 arranged in a staggered pattern. Each ink ejection head 251 includes a large number of nozzles (not shown in FIG. 5) to eject ink. Each nozzle of the ink ejection head 251 included in the K-color head unit 223*k* ejects K color ink, each nozzle of the ink ejection head 251 included in the C-color head unit 223*c* ejects C color ink, each nozzle of the ink ejection head 251 included in the M-color head unit 223*m* ejects M color ink, and each nozzle of the ink ejection head 251 included in the Y-color head unit 223*y* ejects Y color ink.

Figure 6:
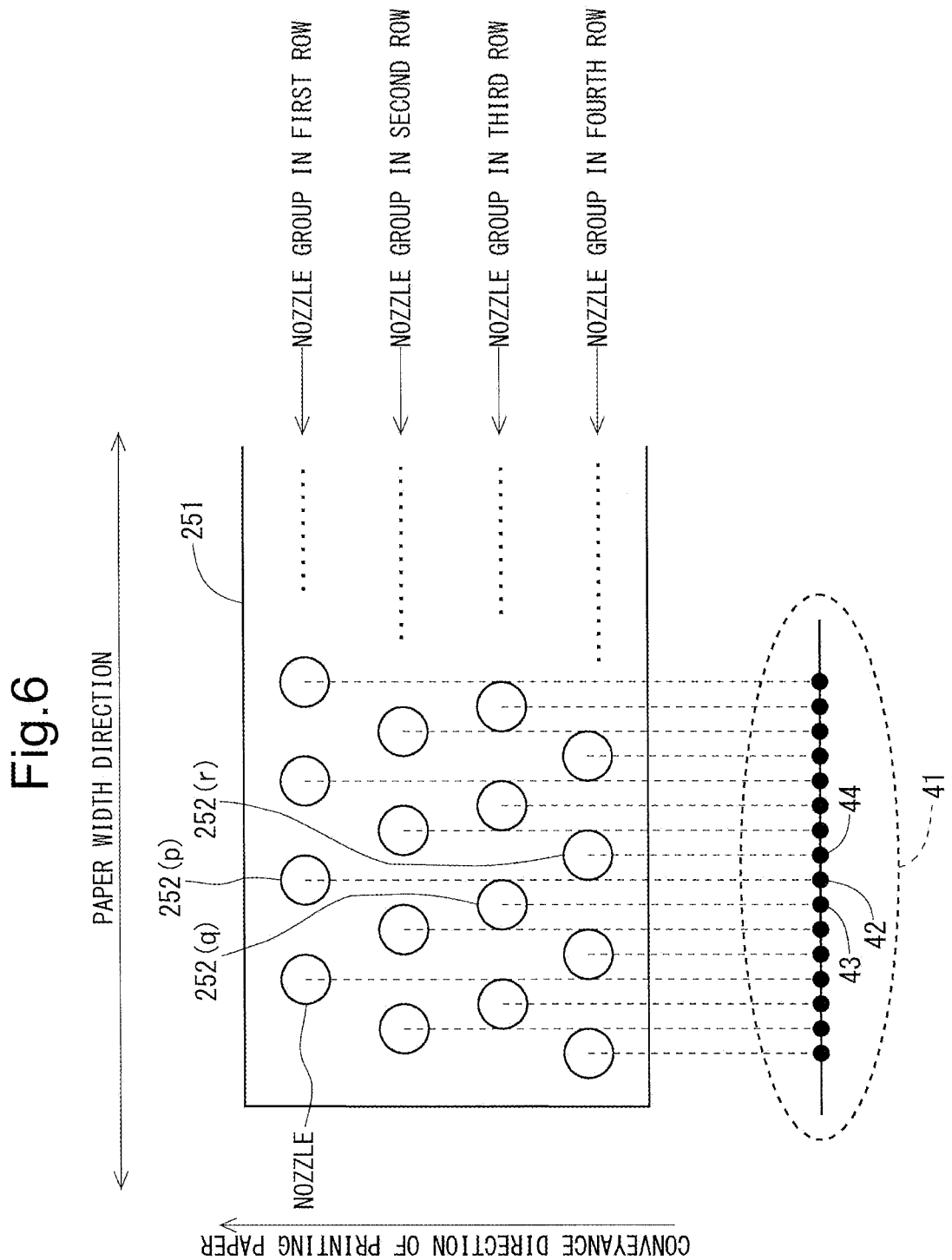
FIG. 6 is a diagram for describing an arrangement example of nozzles in an ink ejection head according to the embodiment.

FIG. 6 is a view for describing an arrangement example of nozzles in the ink ejection head 251. Typically, the ink ejection head 251 includes a plurality of rows of nozzle groups each including a plurality of nozzles arranged side by side in the paper width direction. In the example shown in FIG. 6, four rows of nozzle groups are included in the ink ejection head 251. In FIG. 6, a portion denoted by reference numeral 41 schematically shows landing positions of ink ejected from respective nozzles on the printing paper 5. The plurality of nozzles in the ink ejection head 251 are arranged so that the landing positions of the ink ejected from the nozzles included in the nozzle group in the first row, the landing positions of the ink ejected from the nozzles included in the nozzle group in the second row, the landing positions of the ink ejected from the nozzles included in the nozzle group in the third row, and the landing positions of the ink ejected from the nozzles included in the nozzle group in the fourth row are different positions. For example, the landing position of the ink ejected from each nozzle included in the nozzle group in the first row is a position between the landing position of the ink ejected from the nozzle included in the nozzle group in the third row and the landing position of the ink ejected from the nozzle included in the nozzle group in the fourth row. In the example shown in FIG. 6, a landing position 42 of the ink ejected from a nozzle denoted by reference numeral 252(*p*) is a position between a landing position 43 of the ink ejected from a nozzle denoted by reference numeral 252(*q*) and a landing position 44 of the ink ejected from a nozzle denoted by reference numeral 252(*r*). Note that the conveyance direction of the printing paper 5 corresponds to the first direction, and the paper width direction corresponds to the second direction.

<3. Hardware Configuration of Print Controller>

Figure 7:
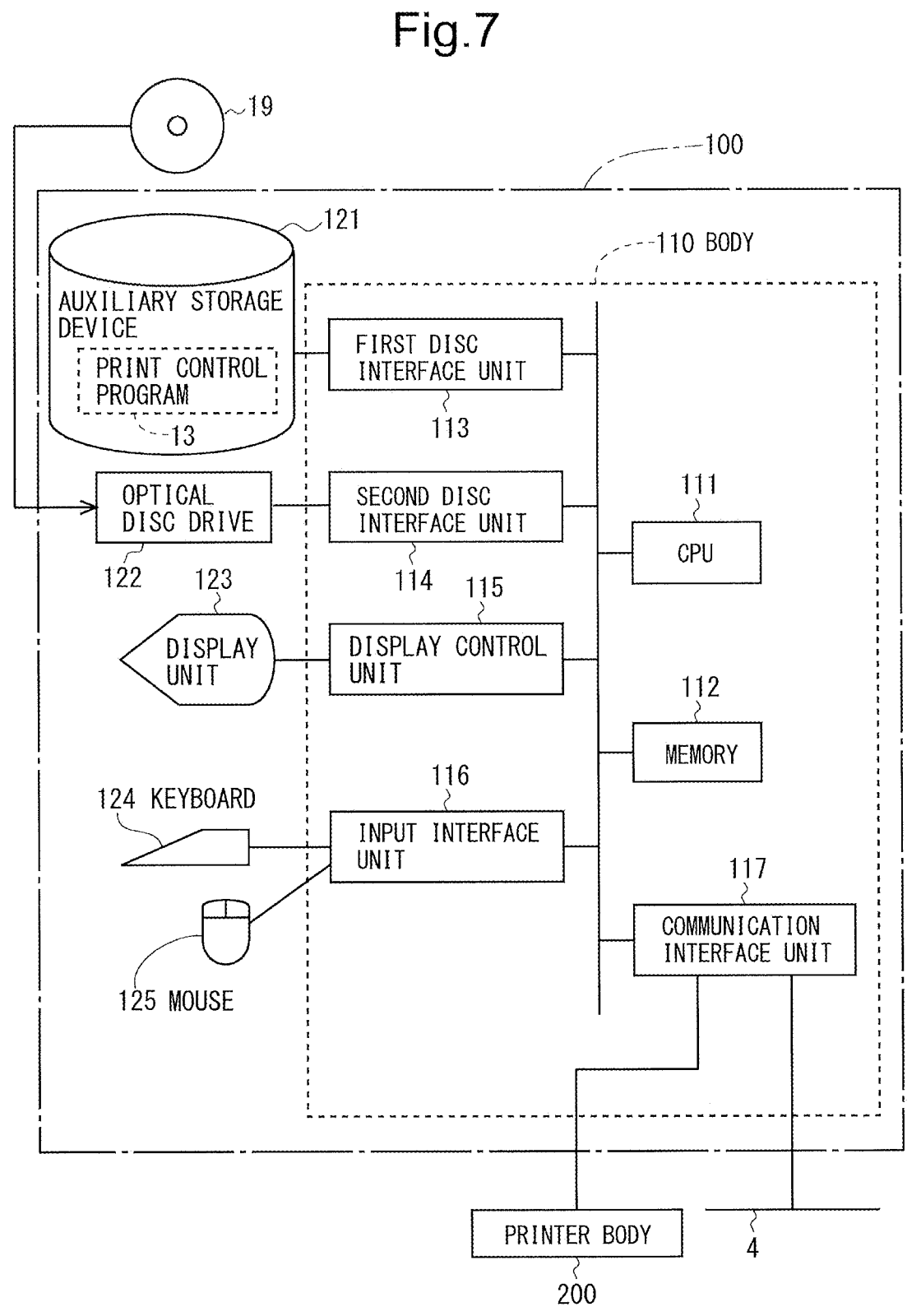

FIG. 7 is a block diagram showing the hardware configuration of the print controller 100. As shown in FIG. 7, the print controller 100 includes a body 110, an auxiliary storage device 121, an optical disc drive 122, a display unit 123, a keyboard 124, a mouse 125, and the like. The body 110 includes a central processing unit (CPU) 111, a memory 112, a first disc interface unit 113, a second disc interface unit 114, a display control unit 115, an input interface unit 116, and a communication interface unit 117. The CPU 111, the memory 112, the first disc interface unit 113, the second disc interface unit 114, the display control unit 115, the input interface unit 116, and the communication interface unit 117 are connected to each other via a system bus. The auxiliary storage device 121 is connected to the first disc interface unit 113. The optical disc drive 122 is connected to the second disc interface unit 114. The display unit (display device) 123 is connected to the display control unit 115. The keyboard 124 and the mouse 125 are connected to the input interface unit 116. The printer body 200 is connected to the communication interface unit 117 via a communication cable. The communication interface unit 117 is connected to the LAN 4. The auxiliary storage device 121 is a magnetic disc device or the like. An optical disc 19 as a computer-readable recording medium, such as a compact disc read-only memory (CD-ROM) or a digital versatile disc (DVD)-ROM, is inserted into the optical disc drive 122. The display unit 123 is a liquid crystal display or the like. The display unit 123 is used to display information desired by an operator. The keyboard 124 and the mouse 125 are used by the operator to input instructions to the print controller 100.

The auxiliary storage device 121 stores a print control program (a program for controlling the execution of a printing process by the printer body 200) 13. The CPU 111 reads the print control program 13 stored in the auxiliary storage device 121 into the memory 112 and executes the program to implement various functions of the print controller 100. The memory 112 includes a random-access memory (RAM) and a read-only memory (ROM). The memory 112 functions as a work area for the CPU 111 to execute the print control program 13 stored in the auxiliary storage device 121. Note that the print control program 13 is provided by being stored in the computer-readable recording medium (non-transitory recording medium). That is, for example, the user purchases the optical disc 19 as the recording medium of the print control program 13, inserts the optical disc into the optical disc drive 122, reads the print control program 13 from the optical disc 19, and installs the print control program in the auxiliary storage device 121.

<4. Functional Configuration of Control Unit>

Figure 8:
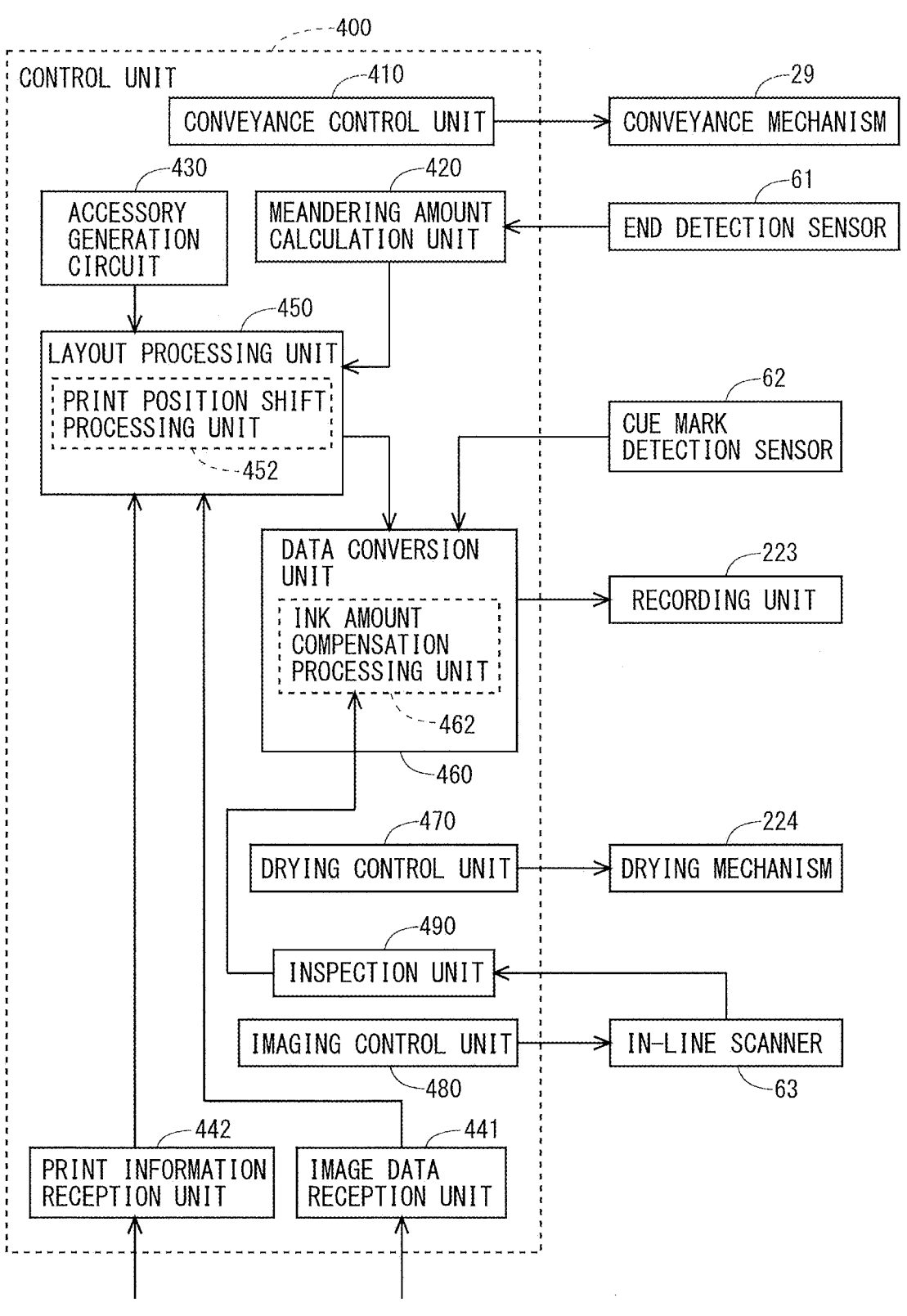
FIG. 8 is a block diagram showing a functional configuration of a control unit implemented by executing a print control program in the print controller according to the embodiment.

FIG. 8 is a block diagram showing a functional configuration of a control unit 400 implemented by the print controller 100 executing the print control program 13. The control unit 400 includes a conveyance control unit 410, a meandering amount calculation unit 420, an accessory generation circuit 430, an image data reception unit 441, a print information reception unit 442, a layout processing unit 450, a data conversion unit 460, a drying control unit 470, an imaging control unit 480, and an inspection unit 490. The layout processing unit 450 includes a print position shift processing unit 452. The data conversion unit 460 includes an ink amount compensation processing unit 462.

The conveyance control unit 410 controls the speed (conveyance speed) at which a conveyance mechanism 29 conveys the printing paper 5. The drying control unit 470 controls a temperature (drying temperature) at which the drying mechanism 224 dries the printing paper 5 after printing. The imaging control unit 480 controls the timing for the in-line scanner 63 to capture a print image. On the basis of a captured image obtained by the in-line scanner 63 capturing a print image of an ejection failure detecting pattern image included in a nozzle check page, the inspection unit 490 inspects the presence or absence of an ejection failure nozzle and identifies the position of the ejection failure nozzle (when there is an ejection failure nozzle).

The meandering amount calculation unit 420 calculates the meandering amount of the printing paper 5 (the magnitude of deviation of the printing paper 5 from the original position) on the basis of the edge position detected by the end detection sensor 61. Note that, for example, when the printing paper 5 deviates rightward in the conveyance direction, the value of the meandering amount becomes positive, and when the printing paper 5 deviates leftward in the conveyance direction, the value of the meandering amount becomes negative. The accessory generation circuit 430 generates an accessory image (e.g., registration marks, cut marks, barcodes) to be placed in an area outside the page on the printing paper 5.

The image data reception unit 441 receives image data transmitted from the print data generation device 30. The print information reception unit 442 receives print information transmitted from the print data generation device 30. The print information includes information defining the arrangement position of each image (image based on image data) on each page, information defining the arrangement position of each accessory image on each page, information for identifying whether the page to be processed is a normal page or a nozzle check page (or information indicating whether a print position shift process is performed on the page to be processed), and other information. Note that the ejection failure detecting pattern image is held in, for example, the auxiliary storage device 121 so that the ejection failure detecting pattern image can be referred to from the layout processing unit 450. However, similarly to the image data, the ejection failure detecting pattern image may also be transmitted from the print data generation device 30 and received by the image data reception unit 441.

The layout processing unit 450 determines the print positions of the respective images (an image included in image data received by image data reception unit 441, an accessory image generated by the accessory generation circuit 430, and an ejection failure detecting pattern image) in each of the plurality of pages to be printed, in consideration of the meandering amount calculated by the meandering amount calculation unit 420 (hereinafter referred to as the "calculated meandering amount"), while referring to the print information received by the print information reception unit 442. As a result, printing image data is generated. At that time, the print position shift processing unit 452 performs the print position shift process on the normal page, but does not perform the print position shift process on the nozzle check page. However, with respect to the nozzle check page, the print position of the cue mark 52 is shifted in the paper width direction on the basis of the calculated meandering amount. Further, in a case in which an accessory image is included in the nozzle check page, the print position of the accessory image is shifted in the paper width direction on the basis of the calculated meandering amount.

From the above, for the normal page, the layout processing unit 450 shifts the print positions of all the images in the paper width direction on the basis of the calculated meandering amount with reference to the print positions when the meandering amount of the printing paper 5 is zero. For the nozzle check page, the layout processing unit 450 shifts the print position of the cue mark 52 in the paper width direction on the basis of the calculated meandering amount with reference to the print position when the meandering amount of the printing paper 5 is zero while maintaining the print position of the ejection failure detecting pattern image at the print position when the meandering amount of the printing paper 5 is zero. In addition, the layout processing unit shifts the print position of the accessory image included in the nozzle check page in the paper width direction on the basis of the calculated meandering amount with reference to the print position when the meandering amount of the printing paper 5 is zero.

Note that, in a case in which the print position of at least a part of the ejection failure detecting pattern image is outside the area of the printing paper 5 due to the meandering of the printing paper 5, the layout processing unit 450 performs a trimming process to remove a portion of the ejection failure detecting pattern image where the print position is outside the area of the printing paper 5, and extends the print area of the ejection failure detecting pattern image by a width equivalent to the calculated meandering amount in the direction in which the printing paper 5 deviates. By performing the trimming process in this manner, the ejection of ink to the outside of the area of the printing paper 5 is prevented. Furthermore, by extending the print area of the ejection failure detecting pattern image by a width equivalent to the calculated meandering amount, the range of nozzles to be inspected for the ink ejection state is prevented from being narrowed due to the meandering of the printing paper 5.

Triggered by the detection of the cue mark 52 by the cue mark detection sensor 62, the data conversion unit 460 performs a halftone process on the printing image data generated by the layout processing unit 450 to generate halftone image data that includes information indicating the dot size of ink corresponding to each pixel. At this time, when the inspection unit 490 has identified the position of the ejection failure nozzle, before the printing image data is subjected to the halftone process, the ink amount compensation processing unit 462 performs an ink amount compensation process to correct the printing image data so that the amount of ink ejected to the printing paper 5 is compensated. Note that a specific method of the halftone process is not particularly limited, and for example, a known method such as the error diffusion method or the dither method can be adopted. The halftone image data generated by the data conversion unit 460 is provided to the recording unit 223. Thus, on the basis of the halftone image data, the ink is ejected from each of nozzles included in each of the ink ejection heads 251 constituting the recording unit 223.

In the present embodiment, the mark image detection sensor is implemented by the cue mark detection sensor 62, the ink ejection control unit is implemented by the data conversion unit 460, and the ejection failure position identification unit is implemented by the inspection unit 490.

<5. Ejection Failure Detecting Pattern Image>

Figure 9:
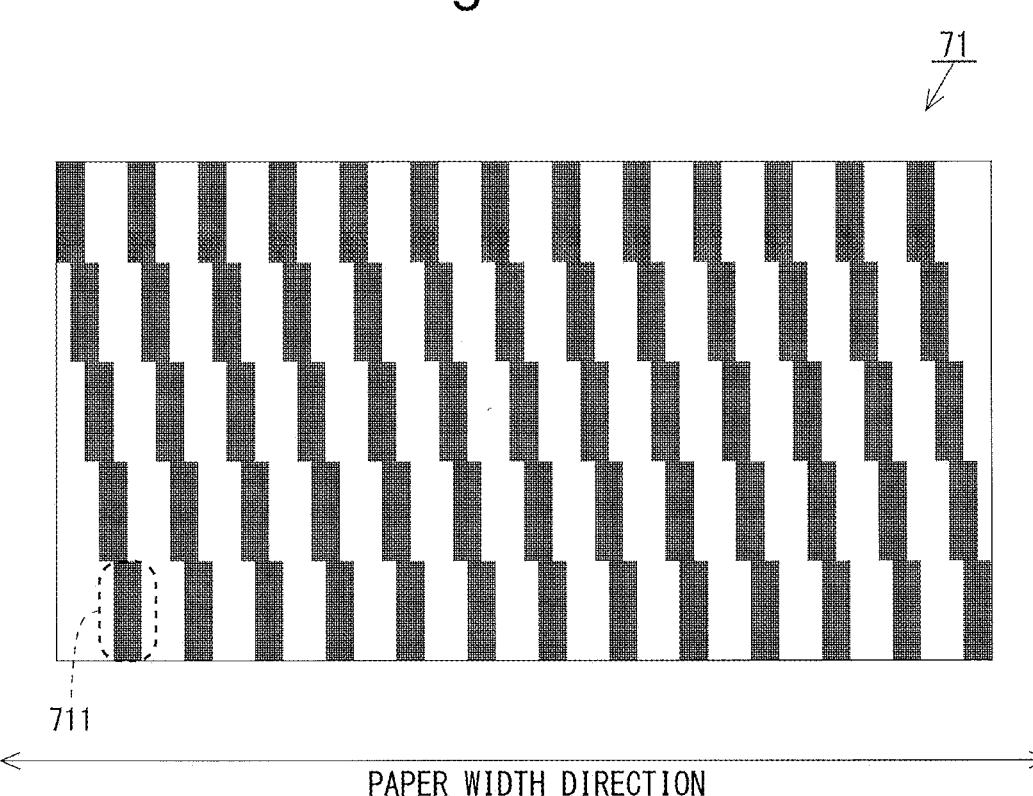
FIG. 9 is a schematic diagram showing an example of an ejection failure detecting pattern image according to the embodiment.

FIG. 9 is a schematic diagram showing an example of an ejection failure detecting pattern image 71 as a test chart included in the nozzle check page. The ejection failure detecting pattern image 71 is composed of a plurality of linear patterns 711 that are stepwise regular patterns. Each linear pattern 711 is a pattern formed by ejecting ink from one corresponding nozzle. In practice, the ejection failure detecting pattern image 71 is composed of more linear patterns 711 than those shown in FIG. 9. For example, when one head unit includes 24,000 nozzles, the ejection failure detecting pattern image 71 for one color is composed of 24,000 linear patterns 711.

<6. Layout Process>

Figure 10:
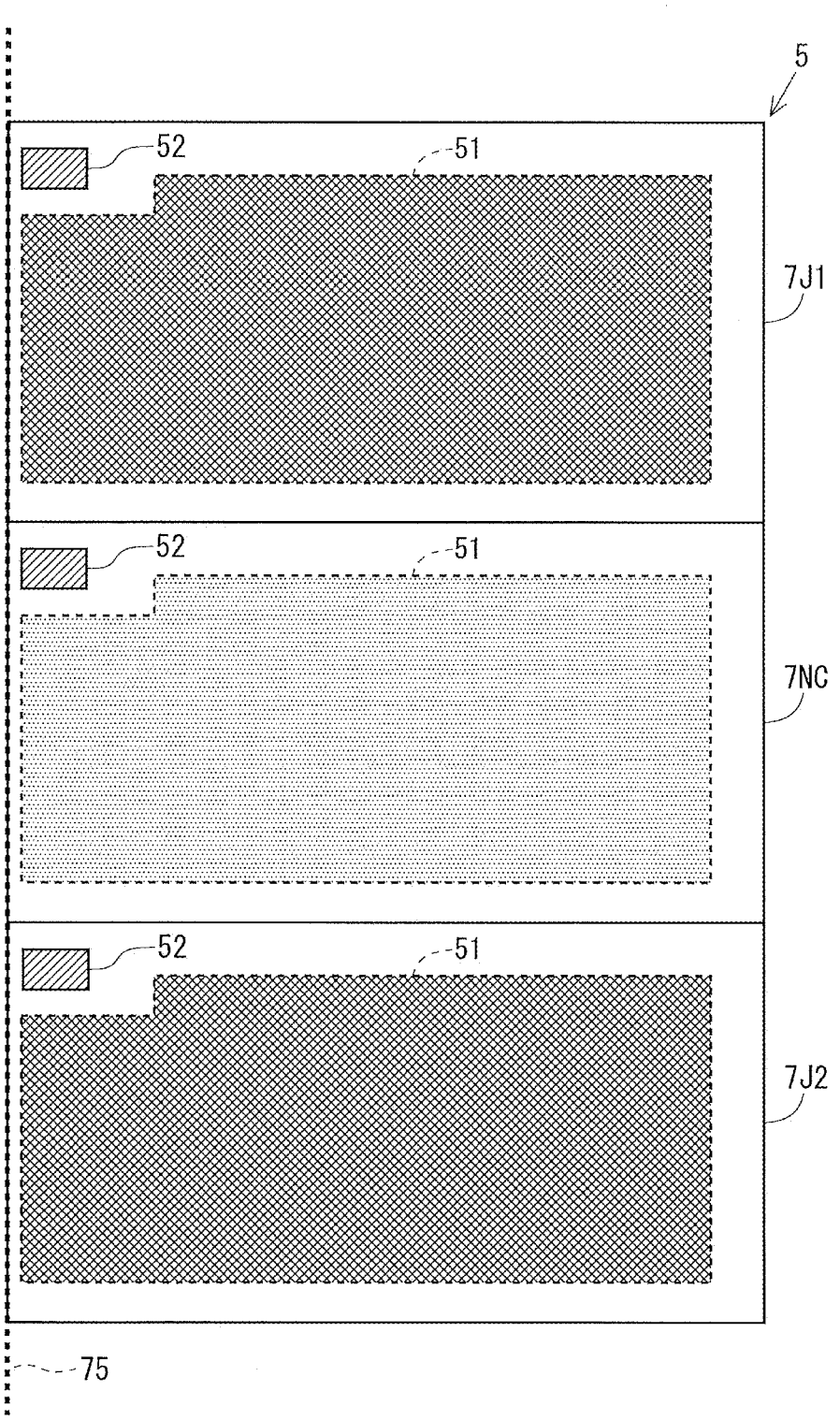
FIG. 10 is a diagram showing a layout obtained when the position of the left end of printing paper coincides with a reference position.
Figure 11:
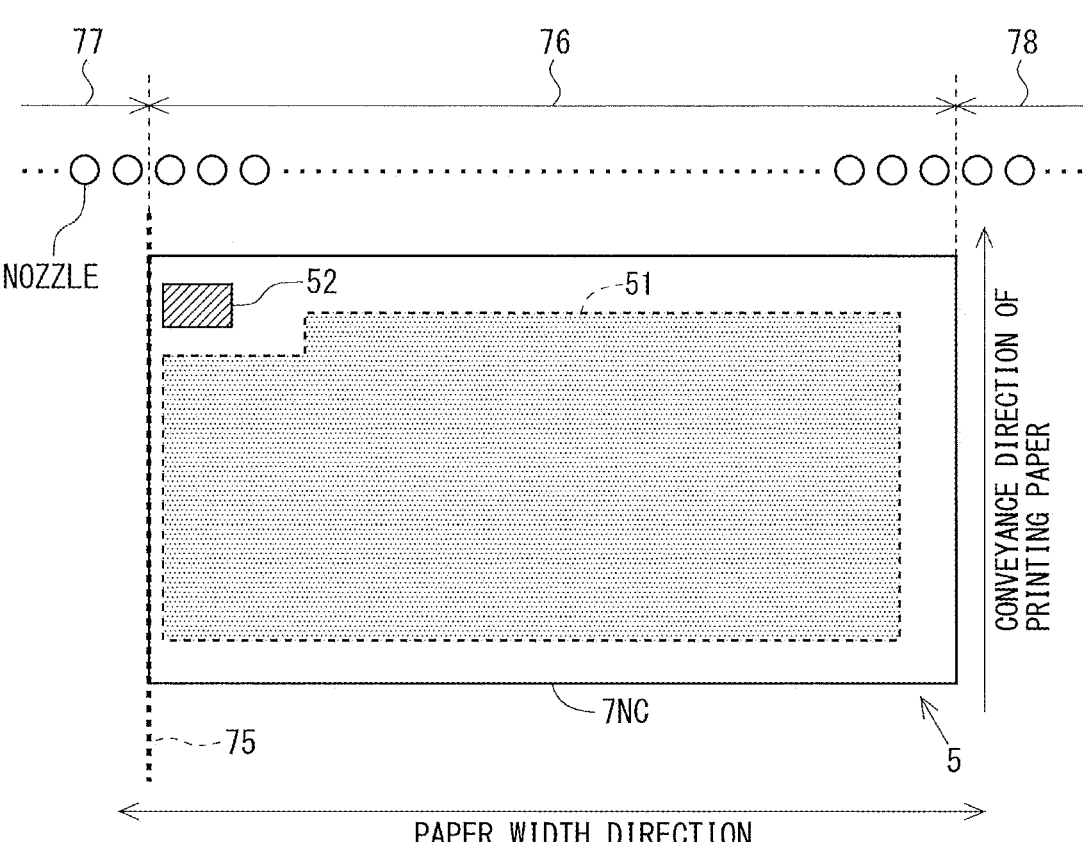
FIG. 11 is a diagram showing the correspondence relationship between the printing paper and the nozzles when the position of the left end of the printing paper coincides with the reference position.

Next, how the layout processing unit 450 performs a layout process (a process of determining the print positions of the respective images in each of the plurality of pages to be printed) will be described with reference to FIGS. 10 to 19. In FIGS. 10 to 19, the nozzle check page is denoted by reference numeral 7NC, the normal page, which is the previous page of the nozzle check page, is denoted by reference numeral 7J1, and the normal page, which is the next page of the nozzle check page, is denoted by reference numeral 7J2. In addition, a thick dotted line representing the original position (hereinafter referred to as "reference position") for the position of the left end of the printing paper 5 is denoted by reference numeral 75. Here, it is assumed that a layout as shown in FIG. 10 is obtained when the position of the left end of the printing paper 5 coincides with the reference position 75 (i.e., when the meandering amount of the printing paper 5 is zero). Furthermore, as shown in FIG. 11, it is assumed that the nozzles are present not only in the range corresponding to the paper width of the printing paper 5 when the position of the left end of the printing paper 5 coincides with the reference position 75 (the range indicated by the arrow denoted by reference numeral 76), but also in the left portion of the printing paper 5 (the portion indicated by the arrow denoted by reference numeral 77) and the right portion of the printing paper 5 (the portion indicated by the arrow denoted by reference numeral 78).

Figure 12:
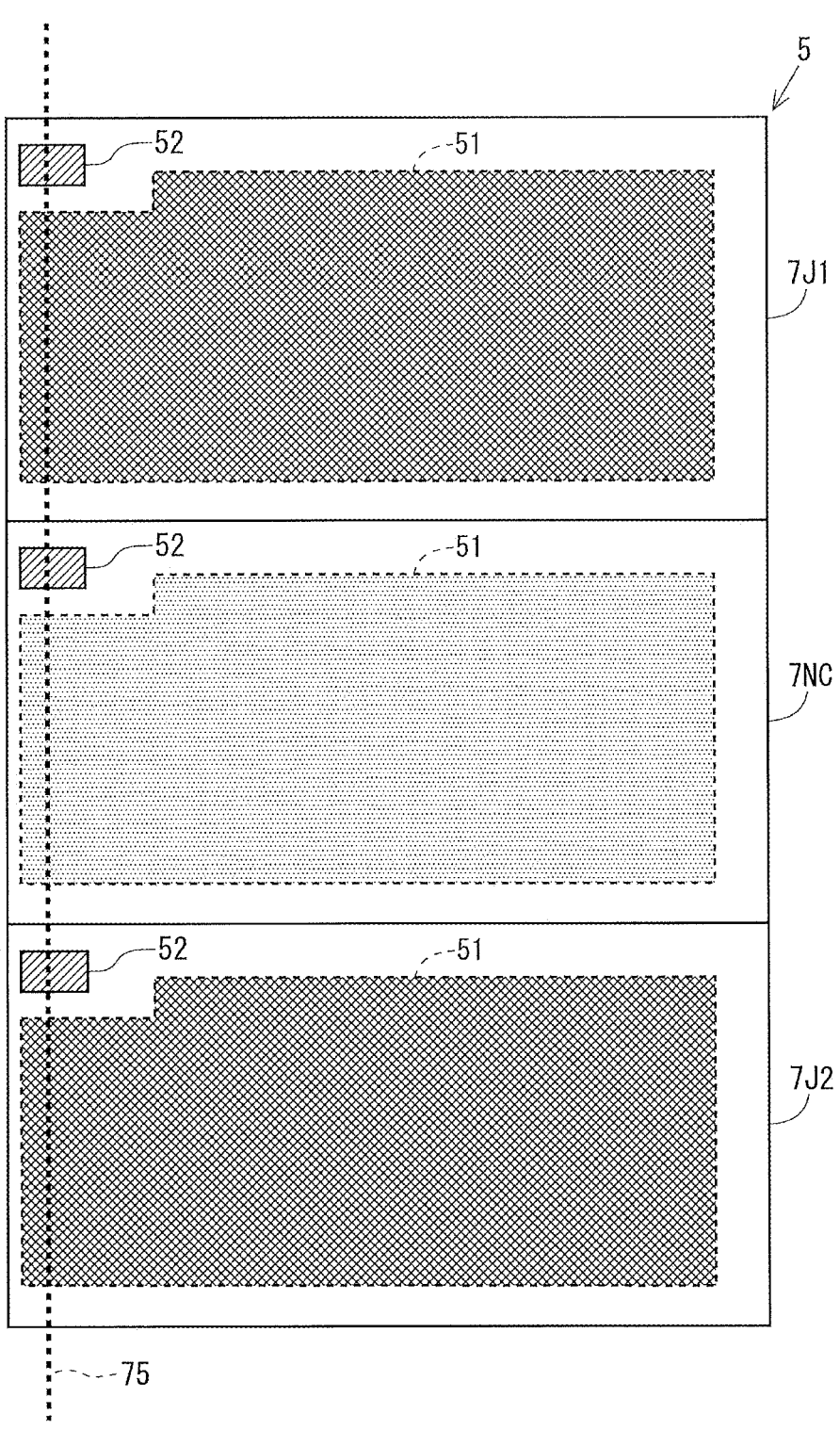
FIG. 12 is a diagram for describing a conventional layout process.
Figure 13:
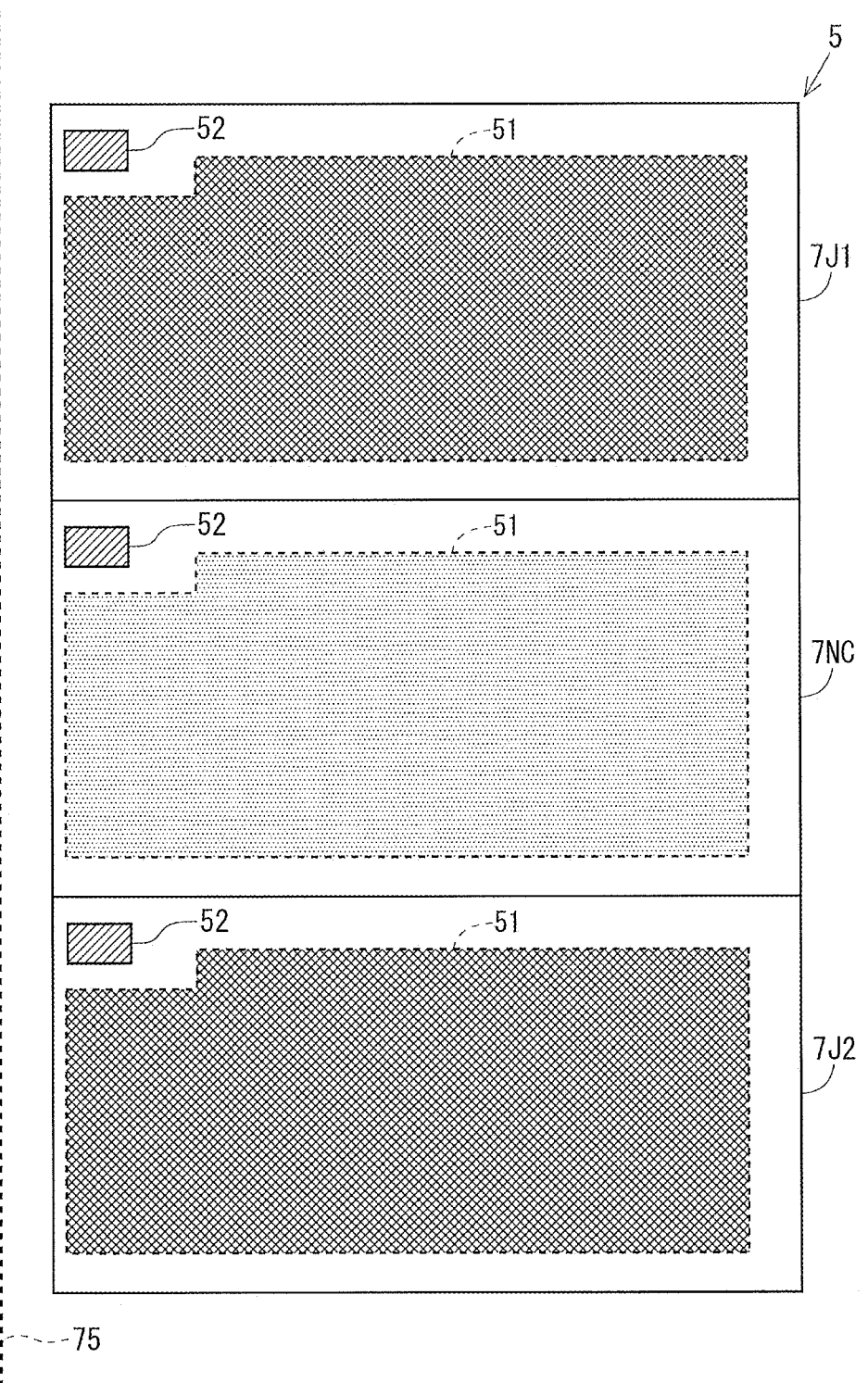
FIG. 13 is a diagram for describing the conventional layout process.

First, a conventional layout process will be described. According to the conventional layout process, the print position shift process described above is performed on both the normal pages 7J1, 7J2 and the nozzle check page 7NC. When the position of the left end of the printing paper 5 deviates to the left side of the reference position 75, for example, a layout as shown in FIG. 12 is obtained. As can be understood from FIGS. 10 and 12, for both the normal pages 7J1, 7J2 and the nozzle check page 7NC, the distance from the left end of the printing paper 5 to the cue mark 52 and the distance from the left end of the printing paper 5 to the image print area 51 do not vary between the case where the position of the left end of the printing paper 5 coincides with the reference position 75 and the case where the position of the left end of the printing paper 5 deviates to the left side from the reference position 75. When the position of the left end of the printing paper 5 deviates to the right side from the reference position 75, for example, a layout as shown in FIG. 13 is obtained. As can be understood from FIGS. 10 and 13, for both the normal pages 7J1, 7J2 and the nozzle check page 7NC, the distance from the left end of the printing paper 5 to the cue mark 52 and the distance from the left end of the printing paper 5 to the image print area 51 do not vary between the case where the position of the left end of the printing paper 5 coincides with the reference position 75 and the case where the position of the left end of the printing paper 5 deviates to the right side from the reference position 75. According to the conventional layout process as described above, nozzles used for printing an image differ between the case where the position of the left end of the printing paper 5 coincides with the reference position 75 and the case where the position of the left end of the printing paper 5 deviates from the reference position 75. Therefore, the accurate position of the ejection failure nozzle cannot be identified on the basis of the print image of the nozzle check page 7NC.

Figure 14:
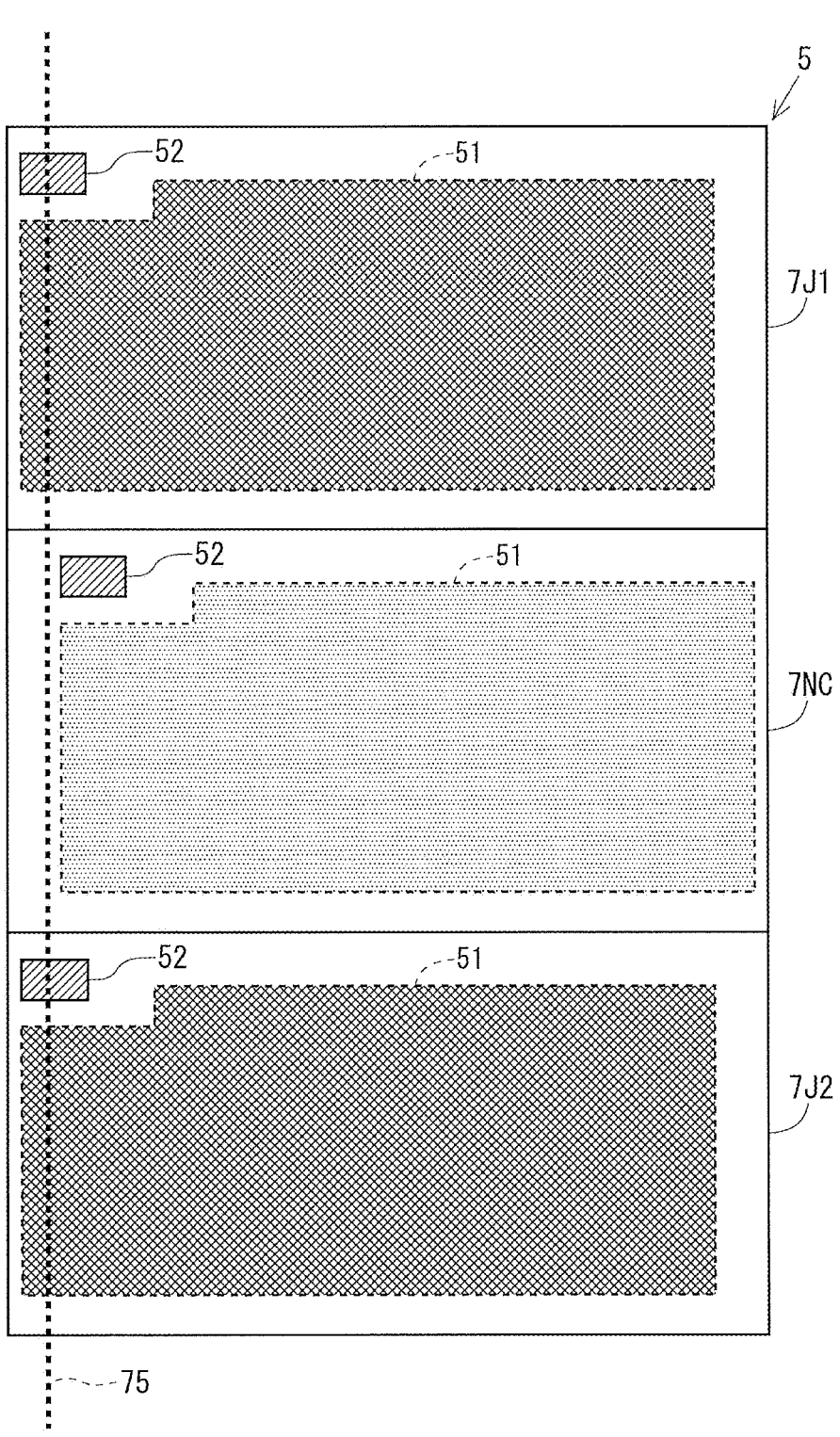
FIG. 14 is a diagram for describing a layout process in a virtual case where only a nozzle check page is not subjected to a print position shift process.
Figure 15:
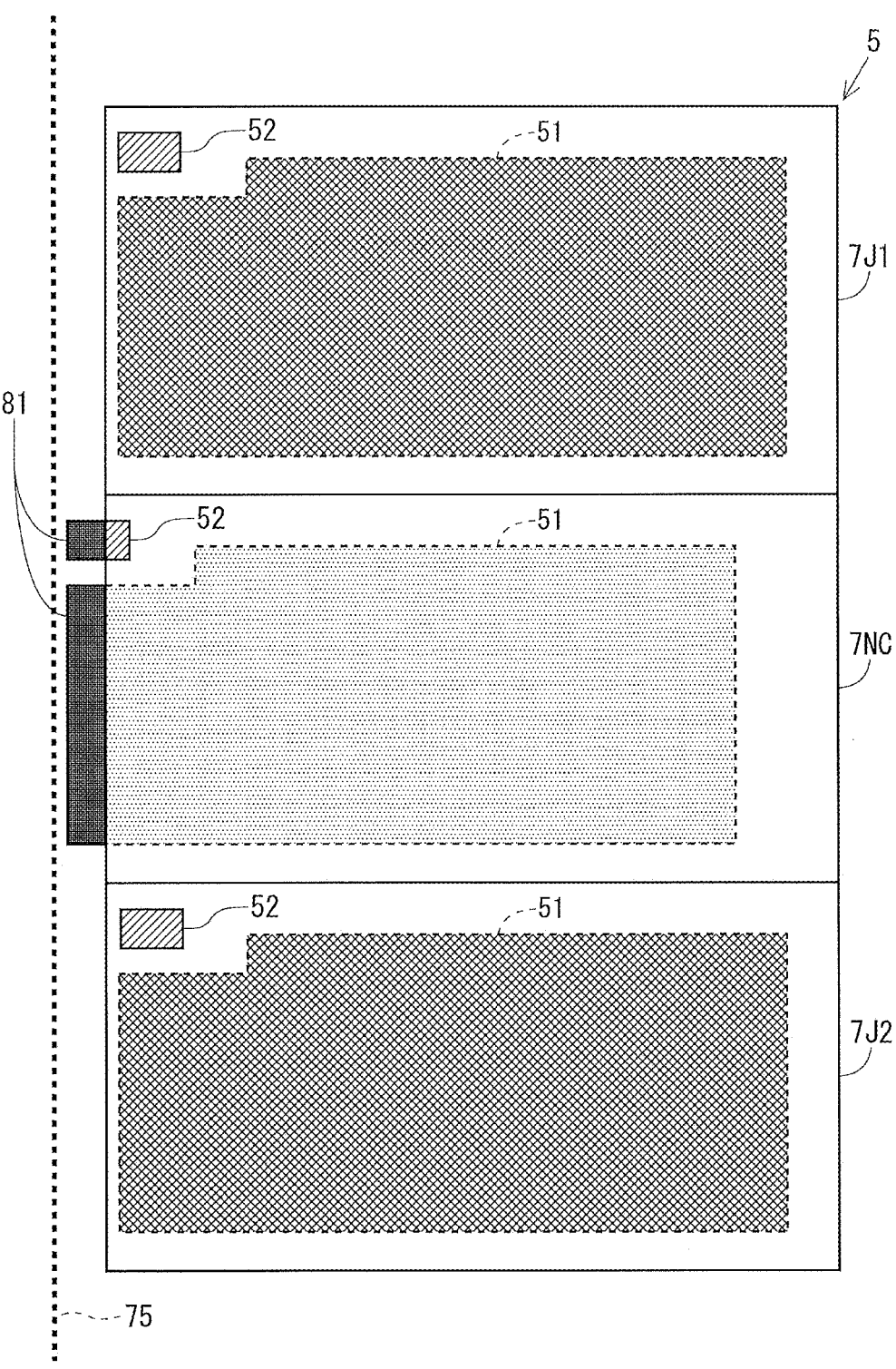
FIG. 15 is a diagram for describing the layout process in the virtual case where only the nozzle check page is not subjected to the print position shift process.

Next, a virtual case where only the nozzle check page 7NC is not subjected to the print position shift process for the conventional layout process will be described. In this case, when the position of the left end of the printing paper 5 deviates to the left side of the reference position 75, for example, a layout as shown in FIG. 14 is obtained. As can be understood from FIGS. 10 and 14, for the normal pages 7J1, 7J2, the distance from the left end of the printing paper 5 to the cue mark 52 and the distance from the left end of the printing paper 5 to the image print area 51 do not vary between the case where the position of the left end of the printing paper 5 coincides with the reference position 75 and the case where the position of the left end of the printing paper 5 deviates to the left side from the reference position 75. For the nozzle check page 7NC, the distance from the left end of the printing paper 5 to the cue mark 52 and the distance from the left end of the printing paper 5 to the image print area 51 differ between the case where the position of the left end of the printing paper 5 coincides with the reference position 75 and the case where the position of the left end of the printing paper 5 deviates to the left side of the reference position 75. Furthermore, in this case, when the position of the left end of the printing paper 5 deviates to the right side from the reference position 75, for example, a layout as shown in FIG. 15 is obtained. As can be understood from FIGS. 10 and 15, for the normal pages 7J1, 7J2, the distance from the left end of the printing paper 5 to the cue mark 52 and the distance from the left end of the printing paper 5 to the image print area 51 do not vary between the case where the position of the left end of the printing paper 5 coincides with the reference position 75 and the case where the position of the left end of the printing paper 5 deviates to the right side from the reference position 75. For the nozzle check page 7NC, there has occurred an image portion (shaded portion denoted by reference numeral 81 in FIG. 15) that cannot be printed because the print position is outside the area of the printing paper 5. According to the process in this case, depending on the meandering state of the printing paper 5, the range of nozzles where the ejection failure can be detected by the nozzle check page 7NC may become narrower than originally intended. In addition, since the distance from the left end of the printing paper 5 to the cue mark 52 in the nozzle check page 7NC differs between the case where the position of the left end of the printing paper coincides with the reference position 75 and the case where the position of the left end of the printing paper 5 deviates from the reference position 75, misalignment between the front and back surfaces and an error when the cue mark 52 is read by the cue mark detection sensor 62 may occur.

Figure 16:
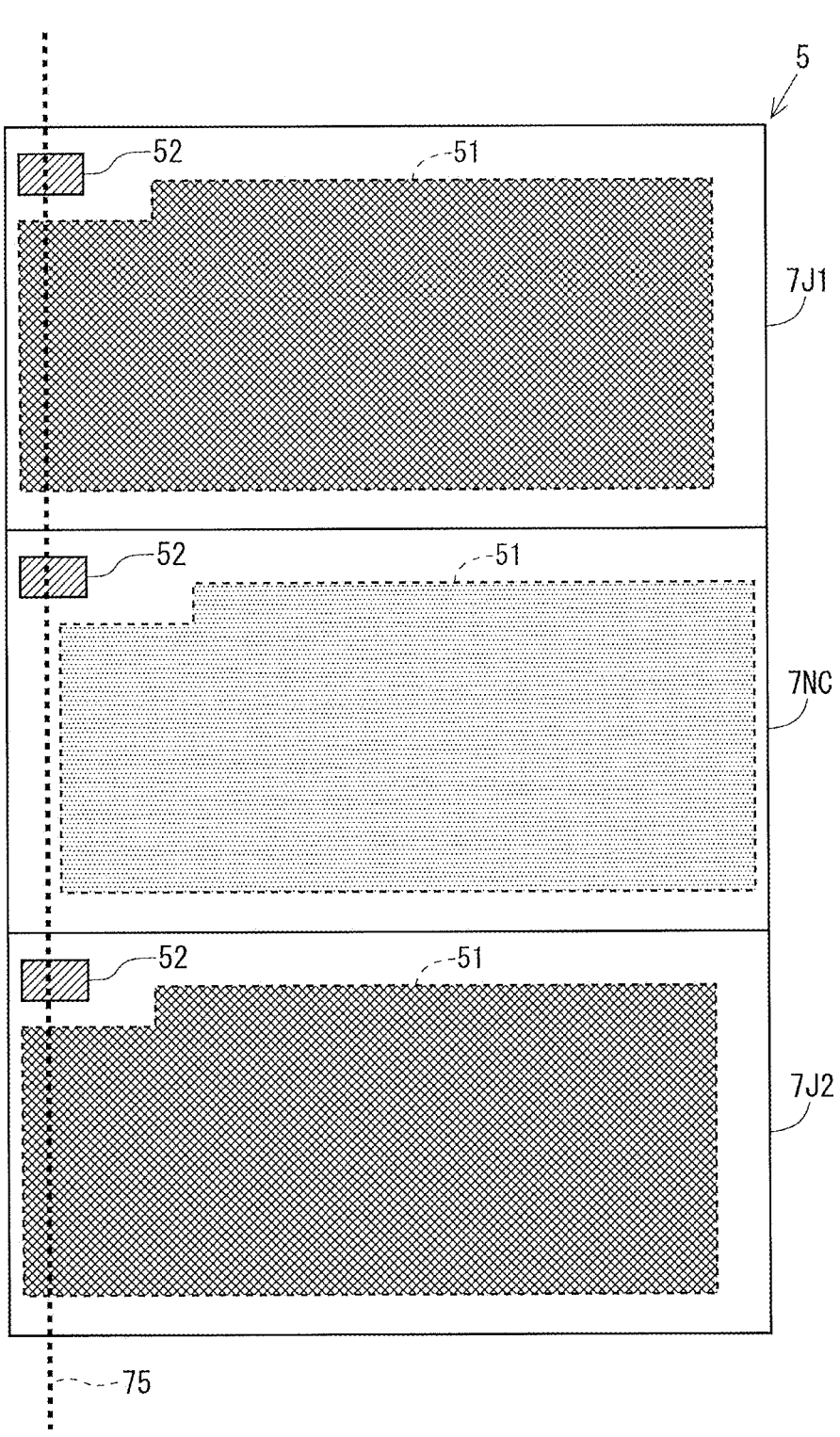
FIG. 16 is a diagram for describing a layout process according to the embodiment.
Figure 17:
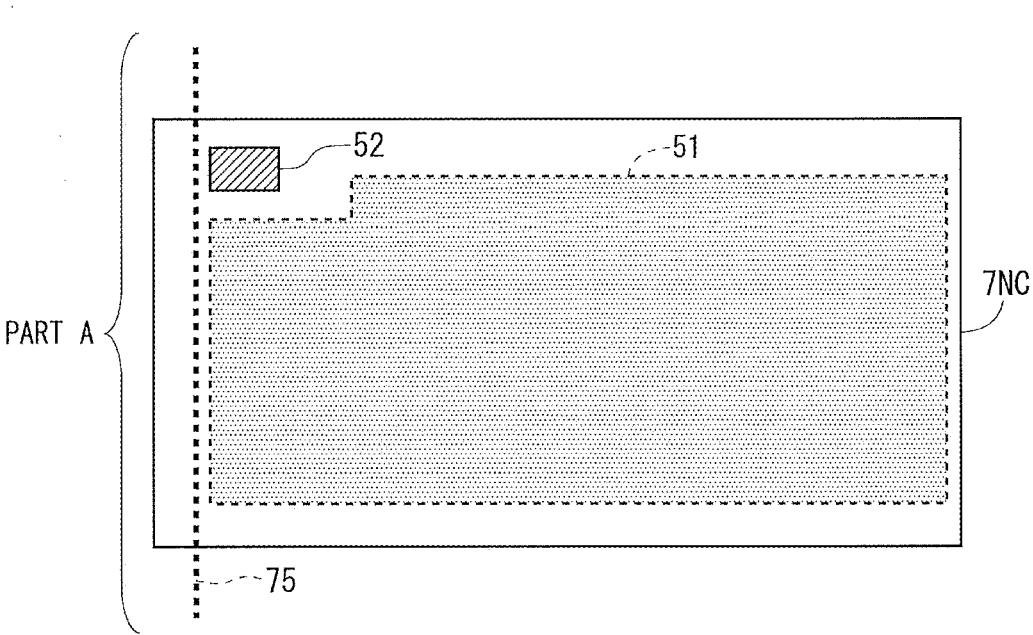
FIG. 17 is a diagram for describing the layout process according to the embodiment.
Figure 17:
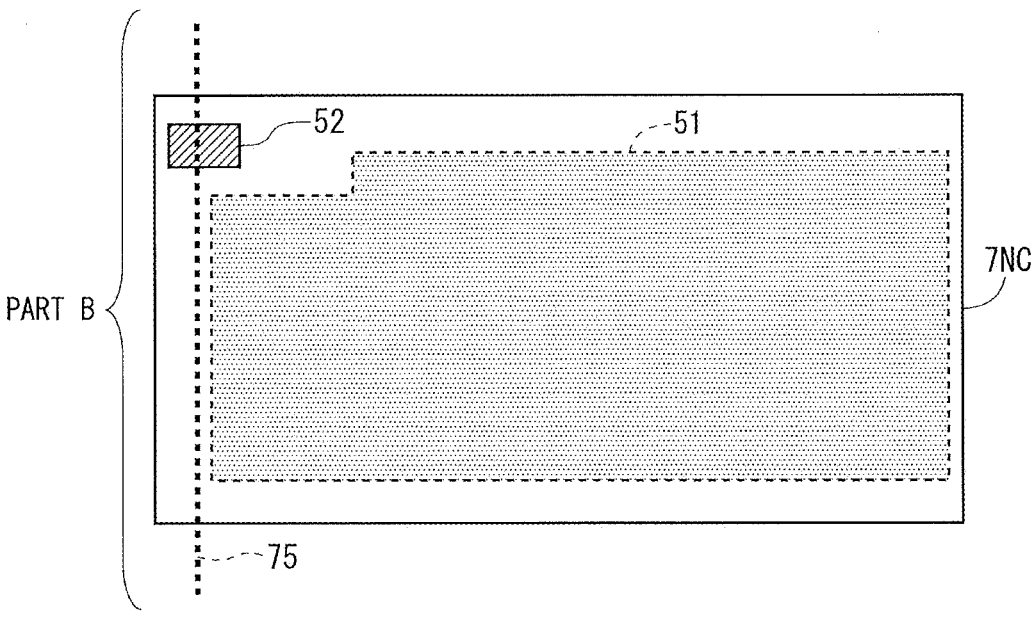
Figure 18:
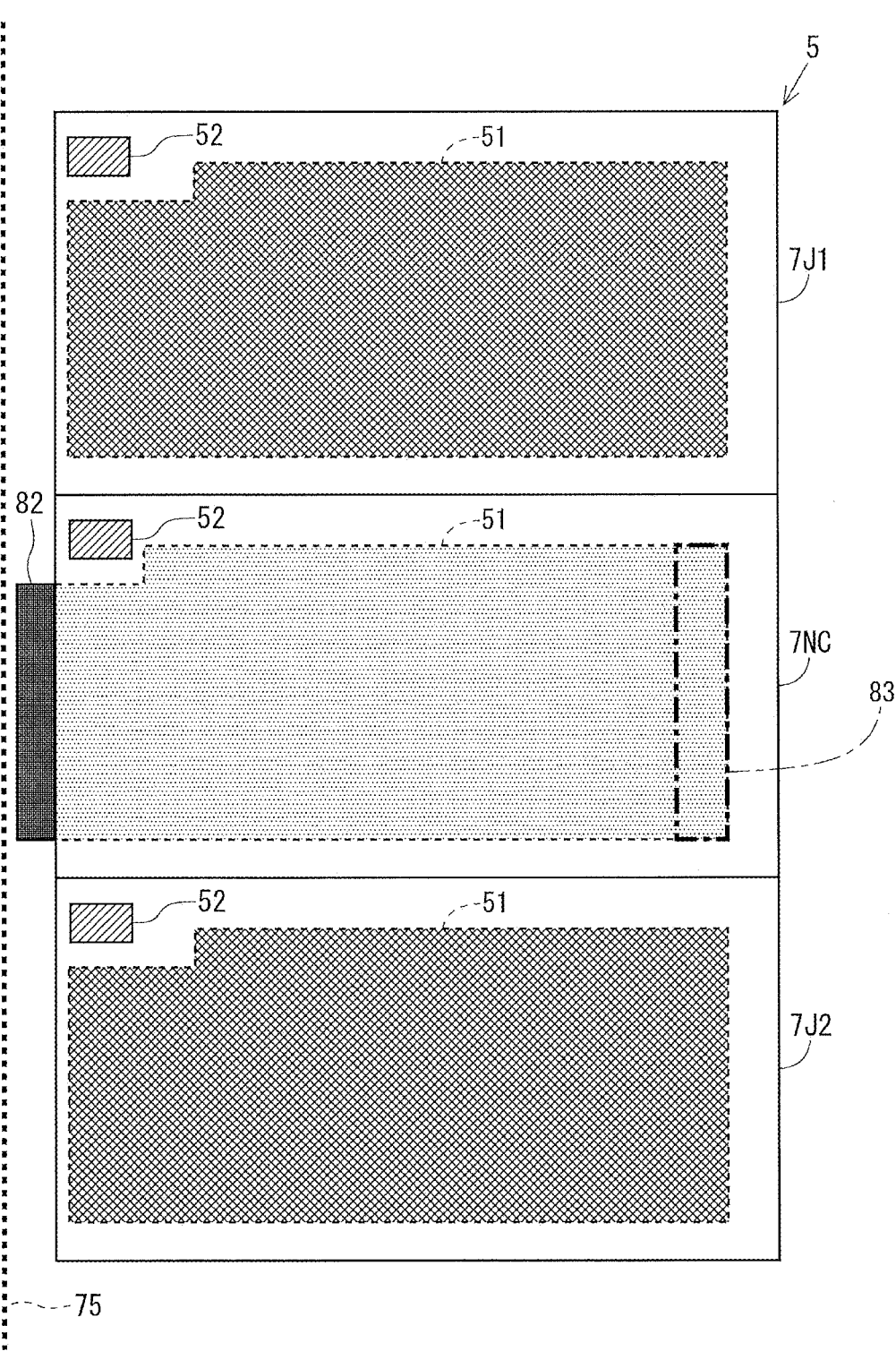
FIG. 18 is a diagram for describing the layout process according to the embodiment.
Figure 19:
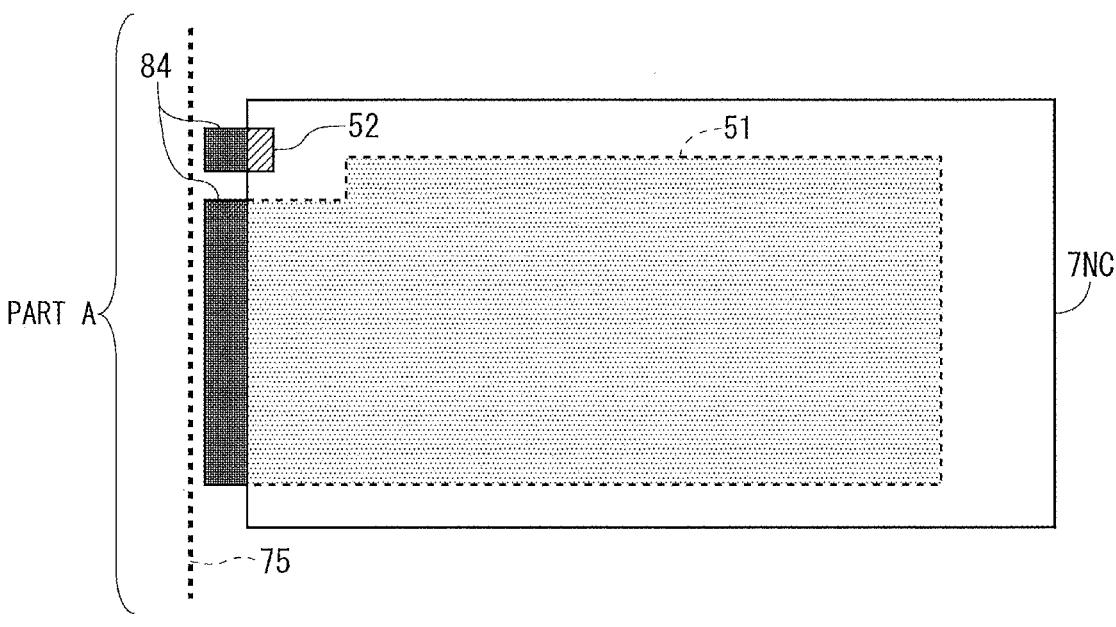
FIG. 19 is a diagram for describing the layout process according to the embodiment.
Figure 19:
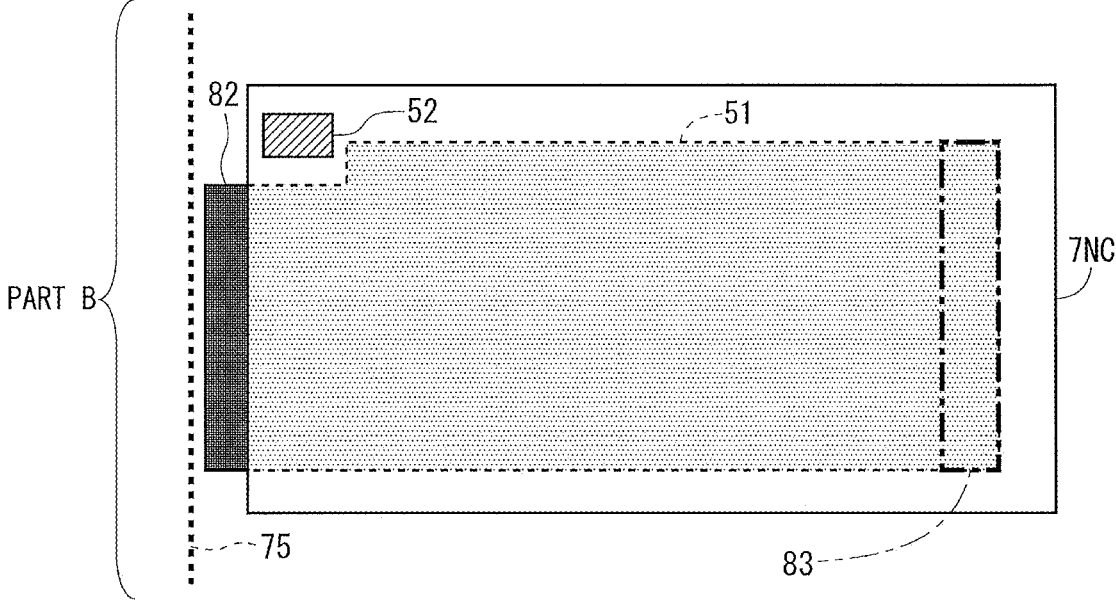

Next, the layout process in the present embodiment will be described. In the present embodiment, when the position of the left end of the printing paper 5 deviates to the left side of the reference position 75, for example, a layout as shown in FIG. 16 is obtained. For the normal pages 7J1, 7J2, the layout similar to that in the case of the conventional layout process (cf. FIG. 12) is obtained. For the nozzle check page 7NC, since the print position shift process is not performed as described above, first, a layout as shown in part A of FIG. 17 is obtained. Thereafter, the print position of the cue mark 52 is shifted by a distance corresponding to the meandering amount calculated by the meandering amount calculation unit 420 in the direction in which the printing paper 5 deviates. As a result, a layout as shown in part B of FIG. 17 is obtained. When the position of the left end of the printing paper 5 deviates to the right side from the reference position 75, for example, a layout as shown in FIG. 18 is obtained. For the normal pages 7J1, 7J2, the layout similar to that in the case of the conventional layout process (cf. FIG. 13) is obtained. For the nozzle check page 7NC, since the print position shift process is not performed, first, a layout similar to that in the virtual case where only the nozzle check page 7NC is not subjected to the print position shift process for the conventional layout process is obtained. That is, a layout as shown in part A of FIG. 19 is obtained. Note that the shaded portions denoted by reference numeral 84 are image portions that cannot be printed because the print position is outside the area of the printing paper 5. After the layout as shown in part A of FIG. 19 is obtained, the print position of the cue mark 52 is shifted by a distance corresponding to the meandering amount calculated by the meandering amount calculation unit 420 in the direction in which the printing paper 5 deviates. As a result, the distance from the left end of the printing paper 5 to the cue mark 52 becomes the same as when the position of the left end of the printing paper 5 coincides with the reference position 75. Moreover, the image print area 51 on which the ejection failure detecting pattern image is printed is extended by a distance (width) corresponding to the meandering amount calculated by the meandering amount calculation unit 420 in the direction in which the printing paper 5 deviates. In this manner described above, a layout as shown in part B of FIG. 19 is obtained. The area denoted by reference numeral 83 in FIG. 18 and part B of FIG. 19 is an area extended in accordance with the meandering of the printing paper 5 in the image print area 51. Note that the area denoted by reference numeral 82 in FIG. 18 and part B of FIG. 19 is an area removed by the trimming process.

As described above, according to the layout process in the present embodiment, the distance from the left end of the printing paper 5 to the cue mark 52 in the nozzle check page 7NC does not vary between the case where the position of the left end of the printing paper 5 coincides with the reference position 75 and the case where the position of the left end of the printing paper 5 deviates from the reference position 75. Therefore, misalignment between the front and back surfaces and an error when the cue mark 52 is read by the cue mark detection sensor 62 does not occur. Further, each image (each linear pattern denoted by reference numeral 711 in FIG. 9) constituting the ejection failure detecting pattern image is formed by ejecting ink from the same nozzle both when the position of the left end of the printing paper 5 coincides with the reference position 75 and when the position of the left end of the printing paper 5 deviates from the reference position 75. Therefore, when an ejection failure nozzle is present, the position of the ejection failure nozzle can be accurately identified on the basis of the print image of the ejection failure detecting pattern image.

<7. Process Procedure>

A procedure for the process related to the meandering correction function will be described with reference to a flowchart shown in FIG. 20. In the present embodiment, a process for a plurality of pages including a normal page and a nozzle check page is performed.

First, the meandering amount calculation unit 420 calculates the meandering amount of the printing paper 5 on the basis of the edge position (position of the end of the printing paper 5) detected by the end detection sensor 61 (step S10). Next, the control unit 400 determines whether all data (image data, print information, etc.) necessary for the process for the page to be processed has been obtained (step S20). As a result, when all the data necessary for the process has been obtained, the process proceeds to step S30, and when there is data that has not yet been obtained among the data necessary for the process, the process returns to step S10.

In step S30, the layout processing unit 450 determines whether the page to be processed is a target of the print position shift process (step S30). As a result, when the page to be processed is the target of the print position shift process, the process proceeds to step S31, and when the page to be processed is not the target of the print position shift process, the process proceeds to step S32. Specifically, the normal page is a target of the print position shift process, and the nozzle check page is not a target of the print position shift process.

In step S31, the layout processing unit 450 performs the layout process including the print position shift process on the page to be processed. More specifically, when the printing image data is generated, the print positions of all the images in the normal page in the image data received by the image data reception unit 441 are shifted depending on the meandering amount calculated in step S10.

In step S32, the layout processing unit 450 performs the layout process in consideration of the meandering amount on the page to be processed without performing the print position shift process on the page to be processed. More specifically, when the printing image data is generated, the print position of the ejection failure detecting pattern image in the nozzle check page is maintained, and the print position of the cue mark 52 in the nozzle check page is shifted depending on the meandering amount calculated in step S10. Note that, as described above, in a case in which the print position of at least a part of the ejection failure detecting pattern image is outside the area of the printing paper 5 due to the meandering of the printing paper 5, the portion of the ejection failure detecting pattern image where the print position is outside the area of the printing paper 5 is removed by the trimming process, and the print area of the ejection failure detecting pattern image is extended by a width equivalent to the meandering amount calculated in step S10 in the direction in which the printing paper 5 deviates.

In step S40, a halftone process is performed by the data conversion unit 460 on the printing image data generated in step S31 or step S32 for the page to be processed. Then, the halftone image data obtained thereby is transferred to the recording unit 223. Thus, on the basis of the halftone image data, the ink is ejected from each of nozzles included in each of the ink ejection heads 251 constituting the recording unit 223

In step S50, the control unit 400 determines whether the process for all the pages has been completed. As a result, when there is a page for which the process has not been completed, the process returns to step S10, and when the process has been completed for all the pages, the entire process related to the meandering correction function ends.

In the present embodiment, obtaining a meandering amount of the print medium is implemented by step S10, generating printing image data is implemented by steps S30 to S32, and controlling ejection of ink is implemented by step S40.

<8. Effects>

The inkjet printing apparatus 10 according to the present embodiment is provided with the layout processing unit 450 that generates printing image data by determining the print positions of the respective images in each of a plurality of pages to be printed, in consideration of the meandering amount of the printing paper 5. For the nozzle check page, the layout processing unit 450 shifts the print position of the cue mark 52 in the paper width direction on the basis of the calculated meandering amount described above with reference to the print position when the meandering amount of the printing paper 5 is zero while maintaining the print position of the ejection failure detecting pattern image at the print position when the meandering amount of the printing paper 5 is zero.

Figure 21:
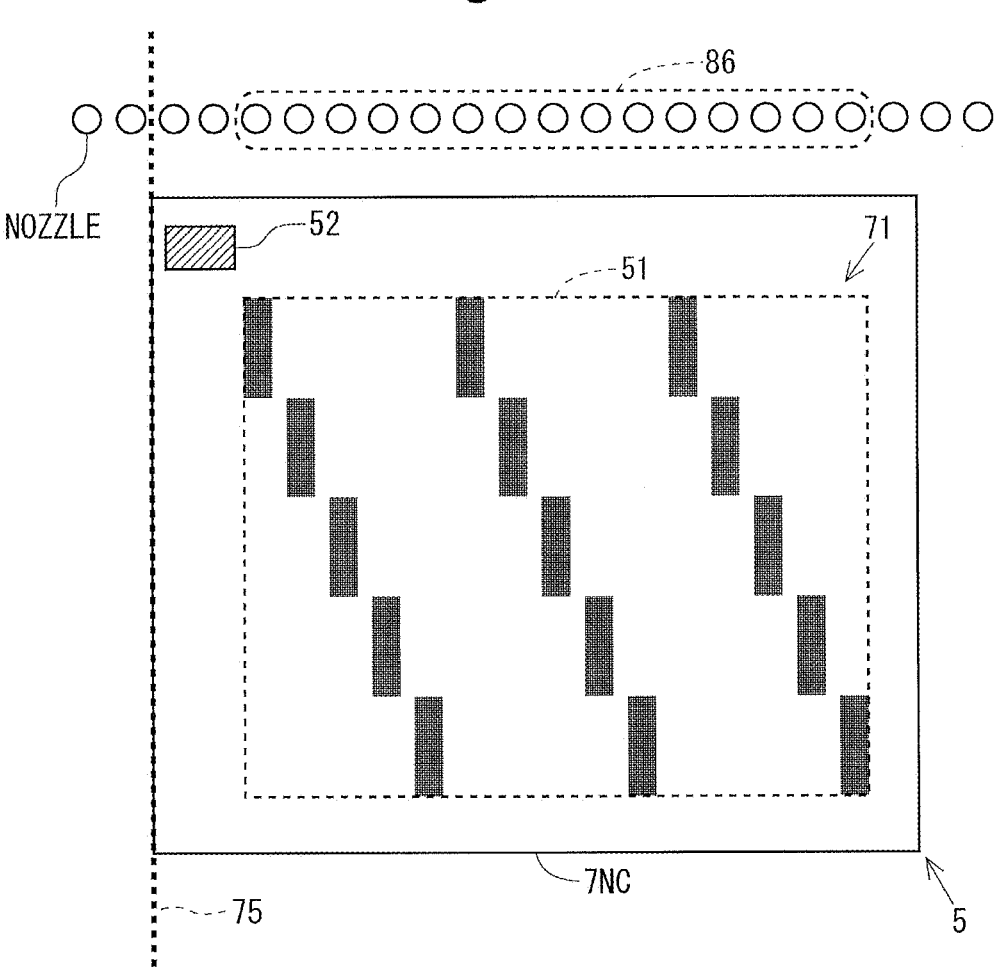
FIG. 21 is a diagram for describing an effect according to the embodiment.
Figure 22:
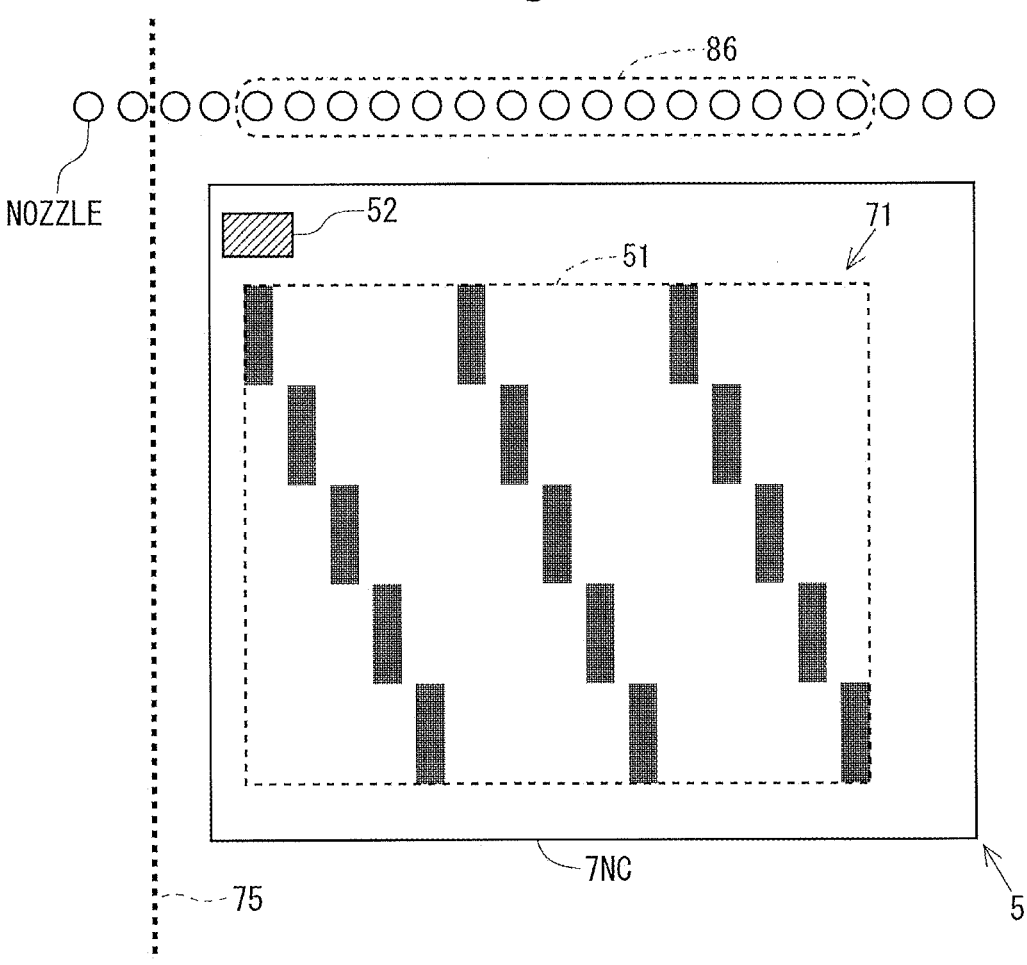
FIG. 22 is a diagram for describing the effect according to the embodiment.

Here, for example, it is assumed that the cue mark 52 and the ejection failure detecting pattern image 71 are laid out as shown in FIG. 21 for the nozzle check page 7NC when the position of the left end of the printing paper 5 coincides with the reference position 75. The nozzles within the dotted line denoted by reference numeral 86 in FIG. 21 are nozzles corresponding to the image print area 51 on which the ejection failure detecting pattern image 71 is printed. Under the above premise, for example, it is assumed that the position of the left end of the printing paper 5 deviates to the right side of the reference position 75 due to the meandering of the printing paper 5. At this time, a layout as shown in FIG. 22 is obtained for the nozzle check page 7NC. The nozzles used for printing the ejection failure detecting pattern image 71 are the same in the layout shown in FIG. 21 and the layout shown in FIG. 22. That is, even when the printing paper 5 meanders, the positional relationship between the ejection failure detecting pattern image 71 and the nozzles is maintained. This enables the position of the ejection failure nozzle to be accurately identified through inspection based on the print image of the ejection failure detecting pattern image 71. Further, the distance from the left end of the printing paper 5 to the cue mark 52 is the same in the layout shown in FIG. 21 and the layout shown in FIG. 22. Therefore, misalignment between the front and back surfaces and an error when the cue mark 52 is read by the cue mark detection sensor 62 does not occur.

As above, according to the present embodiment, the position of the ejection failure nozzle can be accurately identified in the inkjet printing apparatus 10 having the meandering correction function. In addition, since the position of the ejection failure nozzle can be accurately identified, resources and the like required to deal with the ejection failure nozzle are reduced compared to the related art. In this way, it is possible to contribute to the achievement of the sustainable development goals (SDGs). Moreover, a process of compensating the amount of ink ejected onto the printing paper 5 is performed on the basis of the accurately identified position of the ejection failure nozzle. As a result, the occurrence of defects in the print image when the ejection failure nozzle is present is inhibited effectively.

<9. Modifications>

Modifications of the above embodiment will be described below.

<9.1 First Modification>

In the above embodiment, the test chart for detecting an ejection failure nozzle includes only the ejection failure detecting pattern image 71 that is an image of stepwise regular patterns as shown in FIG. 9. However, the present invention is not limited thereto. In the present modification, the test chart for detecting the ejection failure nozzle includes the ejection failure detecting pattern image 71 and a position identifying pattern image for detecting the position of the ejection failure nozzle.

Figure 23:
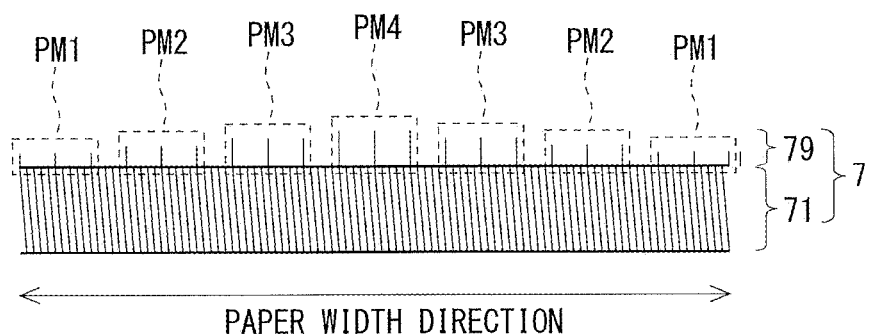
FIG. 23 is a schematic diagram showing a configuration of a test chart used for detecting an ejection failure nozzle in a first modification of the embodiment.

FIG. 23 is a schematic diagram showing a configuration of a test chart 7 used for detecting the ejection failure nozzle in the present modification. As shown in FIG. 23, the test chart 7 according to the present modification includes an ejection failure detecting pattern image 71 in which a large number of linear patterns are regularly arranged stepwise, and a position identifying pattern image 79 including a plurality of linear patterns arranged in the paper width direction. In FIG. 23, for convenience, a stepwise regular pattern constituting the ejection failure detecting pattern image 71 is indicated by a large number of oblique lines arranged in the paper width direction.

This test chart 7 is configured so that the ejection failure detecting pattern image 71 and the position identifying pattern image 79 positionally correspond to each other in the paper width direction. The image on one end side of the ejection failure detecting pattern image 71 and the image on one end side of the position identifying pattern image 79 coincide in position in the paper width direction, and the image on the other end side of the ejection failure detecting pattern image 71 and the image on the other end side of the position identifying pattern image 79 coincide in position in the paper width direction. The plurality of linear patterns constituting the position identifying pattern image 79 are patterns extending in the conveyance direction of the printing paper 5 and are arranged in the paper width direction at equal intervals. Furthermore, with respect to the position identifying pattern image 79, the interval between the adjacent linear patterns is a predetermined interval. Each of the plurality of linear patterns is associated with one specific nozzle, and is a pattern of one dot width recorded on the printing paper 5 only with ink ejected from the corresponding nozzle.

As shown in FIG. 23, the plurality of linear patterns constituting the position identifying pattern image 79 are divided into a plurality of linear pattern groups (in the example shown in FIG. 23, seven linear pattern groups), with three linear patterns of the same length adjacent to each other as one group. Each linear pattern group constitutes a position mark indicating a position in the paper width direction in the test chart 7. In FIG. 23, position marks including linear patterns of the same length are denoted by the same reference numeral. Moreover, as shown in FIG. 23, the position identifying pattern image 79 includes: one or more position mark pairs, with each pair consisting of two position marks that include linear pattern groups of the same length; and one position mark including a linear pattern group (three linear patterns) with a length different from that of any linear pattern group in the one or more position mark pairs. In this regard, the one or more position mark pairs are symmetrically arranged in the paper width direction with the one position mark centered. Therefore, the one position mark is placed at the center, and each position mark pair is placed to sandwich the one position mark. In the example shown in FIG. 23, three position mark pairs (PM1, PM1), (PM2, PM2), (PM3, PM3) are symmetrically arranged with one position mark PM4 centered.

The plurality of position marks in the position identifying pattern image 79 are classified into several types according to the length of the linear pattern group included in each position mark. Note that the length of the linear pattern groups included in each type of position mark is determined in advance. Therefore, the type of each position mark in the position identifying pattern image 79 can be determined by the length of the linear pattern group included in the position mark. Note that, in FIG. 23, the position mark including the shortest linear pattern group is denoted by reference numeral PM1, the position mark including the next shortest linear pattern group is denoted by reference numeral PM2, the position mark including the next shortest linear pattern group is denoted by reference numeral PM3, and the position mark including the longest linear pattern group is denoted by reference numeral PM4. In the example shown in FIG. 23, three position mark pairs (PM1, PM1), (PM2, PM2), (PM3, PM3) are arranged such that the length of the linear pattern becomes shorter as the distance from the center position mark PM4 increases.

As above, the position identifying pattern image 79 included in the test chart 7 in the present modification includes a plurality of position marks each including linear patterns of the same length arranged at predetermined intervals. This enables correct detection of position marks even when a linear pattern that should not normally be present is included in the print image of the test chart 7 due to dust or other reasons. Each linear pattern in each position mark is associated with one specific nozzle. Therefore, a position to be a reference in the print image of the test chart 7 can be obtained from any linear pattern in the detected position mark, and on the basis of the obtained position and the inspection result of the print image of the ejection failure detecting pattern image 71, the position of the ejection failure nozzle can be identified.

Figure 20:
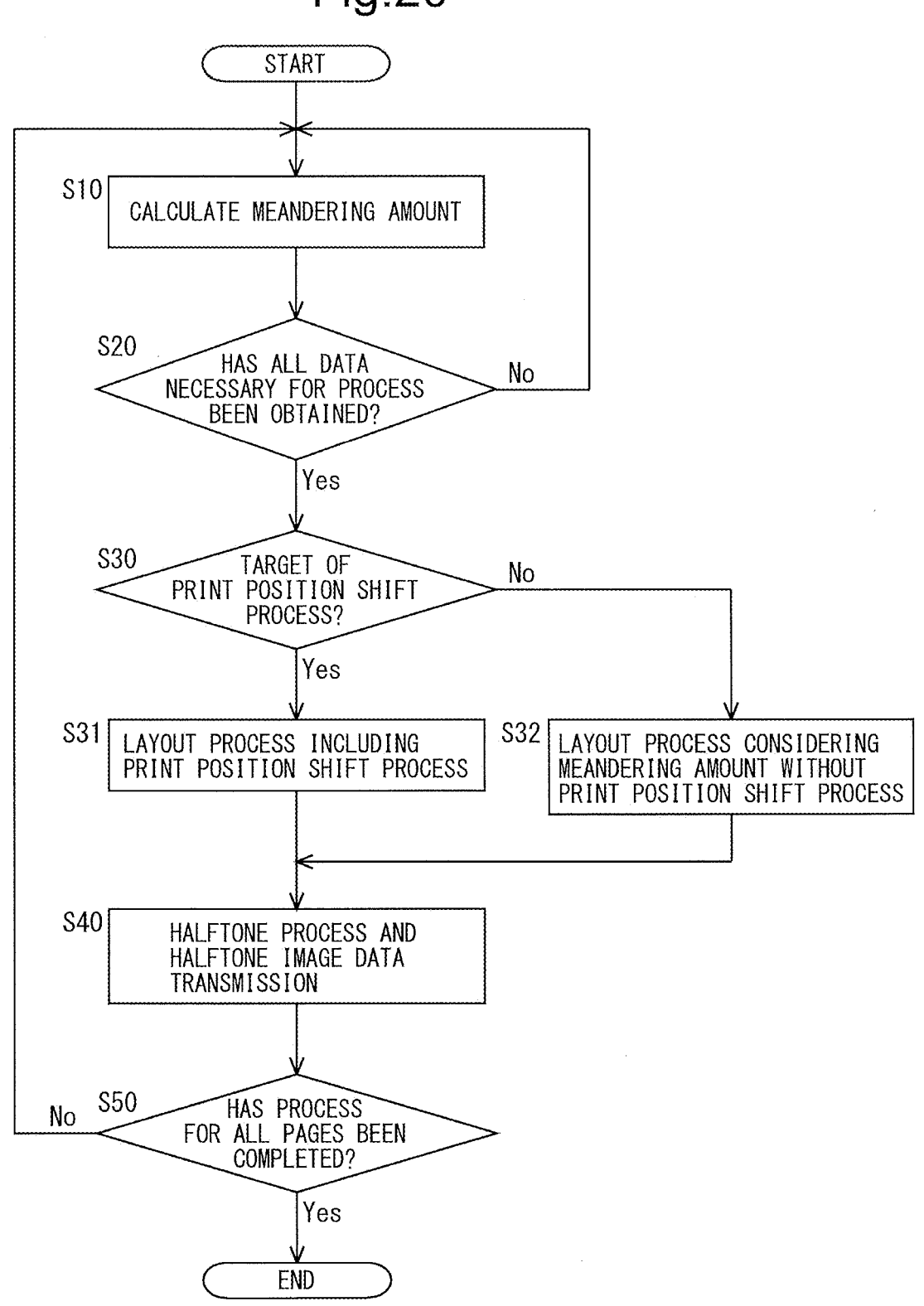
FIG. 20 is a flowchart showing a procedure for a process related to a meandering correction function according to the embodiment.
Figure 24:
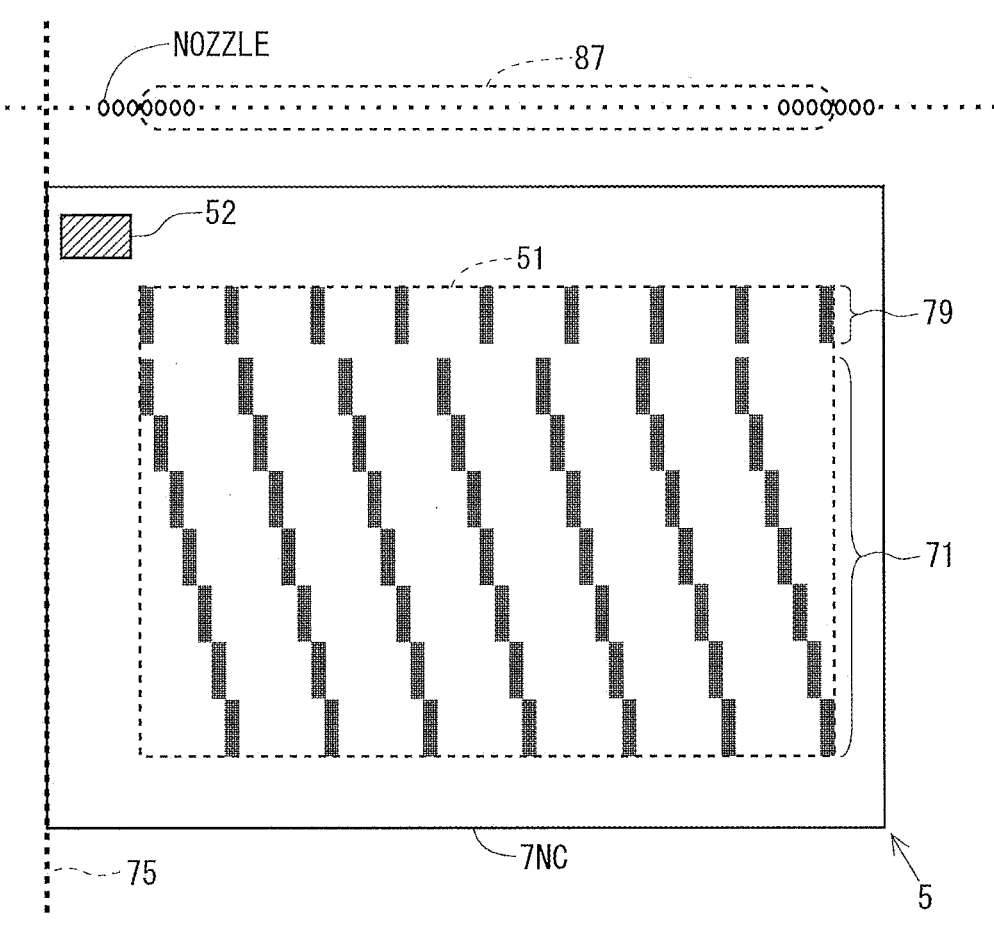
FIG. 24 is a diagram for describing an effect in the first modification.
Figure 25:
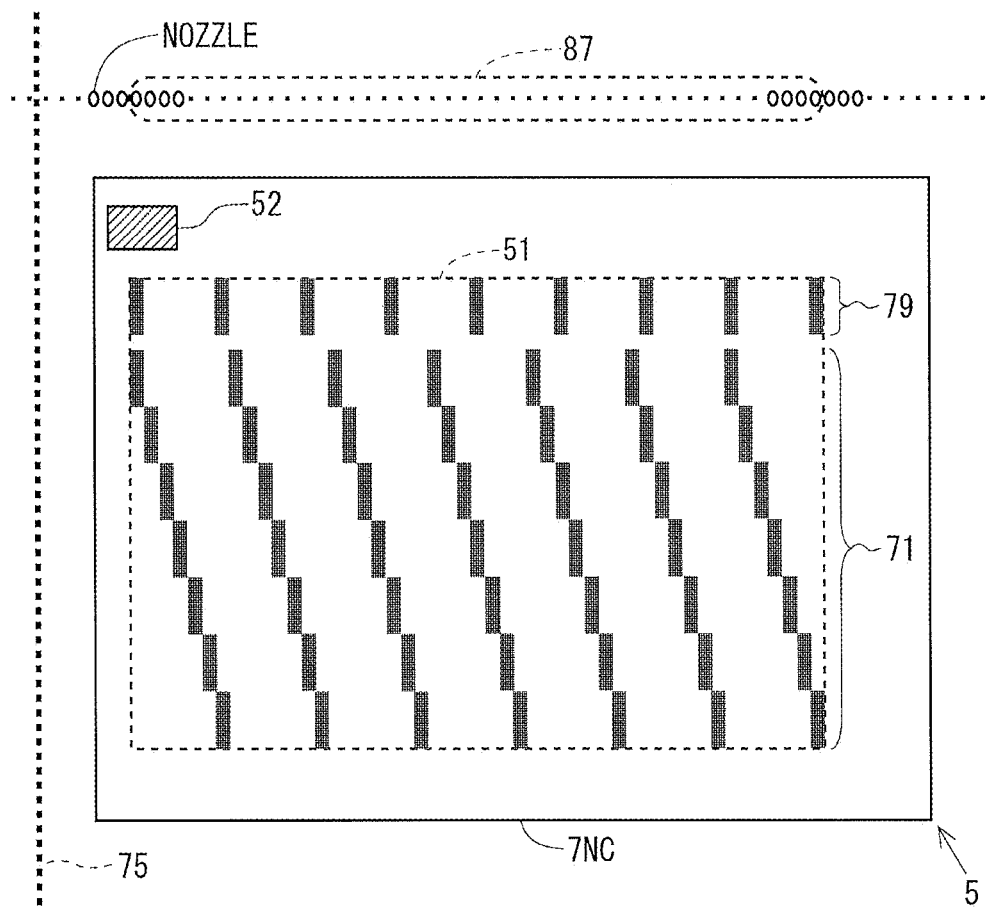
FIG. 25 is a diagram for describing the effect in the first modification.

In the present modification, the layout processing unit 450 does not shift both the print position of the ejection failure detecting pattern image 71 included in the test chart 7 and the print position of the position identifying pattern image 79 included in the test chart 7 in the layout process (step S32 in FIG. 20). For example, it is assumed that the cue mark 52, the position identifying pattern image 79, and the ejection failure detecting pattern image 71 are laid out as shown in FIG. 24 for the nozzle check page 7NC in a case in which the position of the left end of the printing paper 5 coincides with the reference position 75. The nozzles within the dotted line denoted by reference numeral 87 in FIG. 24 are nozzles corresponding to the image print area 51 on which the ejection failure detecting pattern image 71 is printed. Under the above premise, for example, it is assumed that the position of the left end of the printing paper 5 deviates to the right side of the reference position 75 due to the meandering of the printing paper 5. At this time, a layout as shown in FIG. 25 is obtained for the nozzle check page 7NC. In the layout shown in FIG. 24 and the layout shown in FIG. 25, the nozzles used for printing the position identifying pattern image 79 and the nozzles used for printing the ejection failure detecting pattern image 71 are the same. That is, even when the printing paper 5 meanders, the positional relationship between the position identifying pattern image 79 and the nozzles and the positional relationship between the ejection failure detecting pattern image 71 and the nozzles are maintained. Therefore, even when the linear pattern that should not normally be present is included in the print image of the test chart 7 due to dust or other reasons, the position of the ejection failure nozzle can be accurately identified through inspection based on the print image of the ejection failure detecting pattern image 71. Furthermore, the distance from the left end of the printing paper 5 to the cue mark 52 is the same in the layout shown in FIG. 24 and the layout shown in FIG. 25. Therefore, as in the above embodiment, there is no misalignment between the front and back surfaces or an error when the cue mark 52 is read by the cue mark detection sensor 62.

<9.2 Second Modification>

Figure 26:
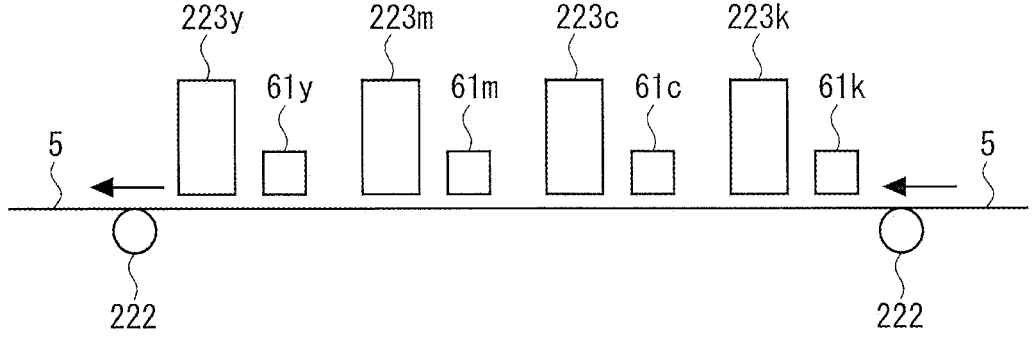
FIG. 26 is a diagram for describing that an end detection sensor is provided per ink color according to a second modification of the embodiment.

The inkjet printing apparatus 10 according to the above embodiment is provided with only one end detection sensor 61. However, the present invention is not limited thereto. For example, as shown in FIG. 26, it is possible to adopt a configuration including a K color end detection sensor 61*k*, a C color end detection sensor 61*c*, an M color end detection sensor 61 *m*, and a Y color end detection sensor 61*y* corresponding to the K-color head unit 223*k*, the C-color head unit 223*c*, the M-color head unit 223*m*, and the Y-color head unit 223*y*. In such a configuration, the meandering amount calculation unit 420 (cf. FIG. 8) can obtain, for each of the plurality of ink colors, the meandering amount of the printing paper 5 on the basis of the position of the end (the end of the printing paper 5) detected by a corresponding end detection sensor 61. Then, the layout processing unit 450 can determine, for each ink color, the print position of each image in consideration of a corresponding meandering (the meandering amount calculated by the meandering amount calculation unit 420). According to the present modification as described above, the print position of each image is adjusted for each ink color, thereby effectively inhibiting the occurrence of misalignment (misregistration) between a plurality of colors.

<10. Supplement>

In the above embodiment, the CPU 111 as a processor executes the print control program 13 to implement various functions of the print controller 100. However, the configuration is not limited to the configuration using only one CPU 111 as shown in FIG. 7. A configuration using a plurality of processors such as a configuration using a plurality of CPUs can also be adopted. As the processor, in addition to the CPU, a micro-processing unit (MPU), a graphics processing unit (GPU), a digital signal processor (DSP), or the like can also be adopted. In addition, a plurality of types of processors can be used in combination. For example, with respect to the components in the control unit 400 shown in FIG. 8, some of the components and the remaining components may be implemented by different processors. Moreover, a configuration including a field-programmable gate array (FPGA) or an application-specific integrated circuit (ASIC) can also be adopted.

<11. Others>

The present invention is not limited to the above embodiment (including the modifications), and various modifications can be made without departing from the gist of the present invention. For example, in the above embodiment (including the modifications), the inkjet printing apparatus 10 that performs color printing is adopted. However, the present invention is not limited thereto, and an inkjet printing apparatus that performs monochrome printing may be adopted.

Furthermore, in the above embodiment (including the modifications), the inkjet printing apparatus 10 using an aqueous ink is adopted. However, the present invention is not limited thereto, and for example, an inkjet printing apparatus using ultraviolet (UV) ink (ultraviolet curing ink)

such as an inkjet printing apparatus for label printing may be adopted. In this case, an ultraviolet irradiation mechanism for curing the UV ink on the printing paper 5 by ultraviolet irradiation is provided inside the printing mechanism 22 (cf. FIG. 3) instead of the drying mechanism 224.

Moreover, in the above embodiment (including the modifications), the inkjet printing apparatus 10 including the printing mechanism 22a for front surface printing and the printing mechanism 22b for back surface printing (i.e., the inkjet printing apparatus capable of duplex printing) is adopted. However, the present invention is not limited thereto, and an inkjet printing apparatus not including the printing mechanism 22b for back surface printing may be adopted.

This application is an application claiming priority based on Japanese Patent Application No. 2023-138919 entitled "Printing Apparatus, Print Control Method, and Print Control Program" filed on Aug. 29, 2023, and the contents of which are herein incorporated by reference.

What is claimed is:

1. A printing that performs printing by apparatus ejecting ink onto a print medium having a shape elongated in a conveyance direction, the printing apparatus comprising:

a conveyance mechanism configured to convey the print medium in a first direction;

at least one ink ejection head including a plurality of nozzles arranged in a second direction orthogonal to the first direction, and configured to eject ink from the plurality of nozzles onto the print medium being conveyed by the conveyance mechanism;

at least one end detection sensor configured to detect a position of an end of the print medium being conveyed by the conveyance mechanism;

a meandering amount calculation unit configured to obtain a meandering amount of the print medium on a basis of the position of the end detected by the at least one end detection sensor;

a mark image detection sensor configured to detect a mark image to be placed at a predetermined position on the print medium;

a layout processing unit configured to generate printing image data by determining, on a basis of input image data including a plurality of images, print positions of respective images on each of a plurality of pages to be printed, in consideration of the meandering amount; and an ink ejection control unit configured to control ejection of ink from the at least one ink ejection head on a basis of the printing image data, wherein the plurality of pages includes a nozzle check page including the mark image and an ejection failure detecting pattern image for detecting a nozzle in an ejection failure state from among the plurality of nozzles, and a normal page including the mark image and an image other than the ejection failure detecting pattern image, and for the normal page, the layout processing unit shifts print positions of all the images in the second direction on a basis of the meandering amount with reference to the print positions when the meandering amount is zero, and for the nozzle check page, the layout processing unit shifts a print position of the mark image in the second direction on a basis of the meandering amount with reference to the print position when the meandering amount is zero while maintaining a print position of the ejection failure detecting pattern image at the print position when the meandering amount is zero.

2. The printing apparatus according to claim 1, wherein the nozzle check page further includes a position identifying pattern image for identifying a position of a nozzle in an ejection failure state detected on a basis of the ejection failure detecting pattern image, and the layout processing unit maintains a print position of the position identifying pattern image at the print position when the meandering amount is zero.

3. The printing apparatus according to claim 1, wherein the nozzle check page includes an accessory image, and the layout processing unit shifts a print position of the accessory image included in the nozzle check page in the second direction on a basis of the meandering amount with reference to the print position when the meandering amount is zero.

4. The printing apparatus according to claim 1, wherein when a print position of at least a part of the ejection failure detecting pattern image is out of an area of the printing medium due to meandering of the printing medium, the layout processing unit performs a trimming process to remove a portion of the ejection failure detecting pattern image where the print position is out of the area of the printing medium.

5. The printing apparatus according to claim 4, wherein when a print position of at least a part of the ejection failure detecting pattern image is out of an area of the printing medium due to meandering of the printing medium, the layout processing unit extends a print area of the ejection failure detecting pattern image by a width equivalent to the meandering amount in a direction in which the printing medium deviates.

6. The printing apparatus according to claim 1, wherein the at least one ink ejection head includes a plurality of ink ejection heads corresponding to a plurality of ink colors, the at least one end detection sensor includes a plurality of end detection sensors corresponding to the plurality of ink ejection heads, the meandering amount calculation unit obtains the meandering amount for each of the plurality of ink colors, and the layout processing unit determines, for each color, the print positions of the respective images in consideration of the meandering amount corresponding to relevant color.

7. The printing apparatus according to claim 1, further comprising an imaging device configured to capture the ejection failure detecting pattern image recorded on the print medium.

8. The printing apparatus according to claim 7, further comprising:

an ejection failure position identification unit configured to identify a position of a nozzle in an ejection failure state on a basis of the ejection failure detecting pattern image captured by the imaging device; and an ink amount compensation processing unit configured to correct the printing image data so that an amount of ink ejected to the print medium is compensated on a basis of the position of the nozzle in the ejection failure state identified by the ejection failure position identifying unit.

9. A printing apparatus that performs printing by ejecting ink onto a print medium having a shape elongated in a conveyance direction, the printing apparatus comprising:

a conveyance mechanism configured to convey the print medium in a first direction;

at least one ink ejection head including a plurality of nozzles arranged in a second direction orthogonal to the first direction, and configured to eject ink from the plurality of nozzles onto the print medium being conveyed by the conveyance mechanism;

at least one end detection sensor configured to detect a position of an end of the print medium being conveyed by the conveyance mechanism;

a mark image detection sensor configured to detect a mark image to be placed at a predetermined position on the print medium;

a processor; and a memory configured to store a program, wherein when the program stored in the memory is executed by the processor, the program causes the processor to execute:

(A) obtaining a meandering amount of the print medium on a basis of the position of the end detected by the at least one end detection sensor, (B) generating printing image data by determining, on a basis of input image data including a plurality of images, print positions of respective images on each of a plurality of pages to be printed, in consideration of the meandering amount, and (C) controlling ejection of ink from the at least one ink ejection head on a basis of the printing image data, the plurality of pages includes a nozzle check page including the mark image and an ejection failure detecting pattern image for detecting a nozzle in an ejection failure state from among the plurality of nozzles, and a normal page including the mark image and an image other than the ejection failure detecting pattern image, and in generating the printing image data, for the normal page, the processor shifts print positions of all the images in the second direction on a basis of the meandering amount with reference to the print positions when the meandering amount is zero, and for the nozzle check page, the processor shifts a print position of the mark image in the second direction on a basis of the meandering amount with reference to the print position when the meandering amount is zero while maintaining a print position of the ejection failure detecting pattern image at the print position when the meandering amount is zero.

10. A print control method used in a printing apparatus that performs printing by ejecting ink onto a print medium having a shape elongated in a conveyance direction, the printing apparatus including a conveyance mechanism configured to convey the print medium in a first direction, at least one ink ejection head including a plurality of nozzles arranged in a second direction orthogonal to the first direction, and configured to eject ink from the plurality of nozzles onto the print medium being conveyed by the conveyance mechanism, at least one end detection sensor configured to detect a position of an end of the print medium being conveyed by the conveyance mechanism, and a mark image detection sensor configured to detect a mark image to be placed at a predetermined position on the print medium, the print control method comprising:

obtaining a meandering amount of the print medium on a basis of the position of the end detected by the at least one end detection sensor;

generating printing image data by determining, on a basis of input image data including a plurality of images, print positions of respective images on each of a plurality of pages to be printed, in consideration of the meandering amount; and controlling ejection of ink from the at least one ink ejection head on a basis of the printing image data, wherein the plurality of pages includes a nozzle check page including the mark image and an ejection failure detecting pattern image for detecting a nozzle in an ejection failure state from among the plurality of nozzles, and a normal page including the mark image and an image other than the ejection failure detecting pattern image, and in generating the printing image data, for the normal page, print positions of all the images are shifted in the second direction on a basis of the meandering amount with reference to the print positions when the meandering amount is zero, and for the nozzle check page, a print position of the ejection failure detecting pattern image is maintained at the print position when the meandering amount is zero and a print position of the mark image is shifted in the second direction on a basis of the meandering amount with reference to the print position when the meandering amount is zero.

* * * * *